United States Patent
Pretorius et al.

(10) Patent No.: US 10,311,722 B2
(45) Date of Patent: Jun. 4, 2019

(54) VEHICLE IDENTIFICATION AND/OR MONITORING SYSTEM

(71) Applicant: LicenSys Australasia Pty Ltd, Sumner, Queensland (AU)

(72) Inventors: Albertus Jacobus Pretorius, Sumner (AU); Andy Goran Olsson, Sumner (AU)

(73) Assignee: LICENSYS AUSTRALASIA PTY LTD, Sumner (AU)

( * ) Notice: Subject to any disclaimer, the term of this patent is extended or adjusted under 35 U.S.C. 154(b) by 105 days.

(21) Appl. No.: 15/302,248

(22) PCT Filed: Apr. 9, 2015

(86) PCT No.: PCT/AU2015/050161
§ 371 (c)(1),
(2) Date: Oct. 6, 2016

(87) PCT Pub. No.: WO2015/157814
PCT Pub. Date: Oct. 22, 2015

(65) Prior Publication Data
US 2017/0032666 A1     Feb. 2, 2017

(30) Foreign Application Priority Data
Apr. 14, 2014   (AU) ................................ 2014901356

(51) Int. Cl.
*G08G 1/017*     (2006.01)
*G06K 7/10*      (2006.01)
(Continued)

(52) U.S. Cl.
CPC ......... *G08G 1/017* (2013.01); *G06K 7/10366* (2013.01); *G06K 7/10425* (2013.01);
(Continued)

(58) Field of Classification Search
None
See application file for complete search history.

(56) References Cited

U.S. PATENT DOCUMENTS 5,192,954 A * 3/1993 Brockelsby ............. B61L 25/04
                                                          342/368
5,196,846 A * 3/1993 Brockelsby ............. B61L 25/04
                                                          340/10.51
(Continued)

FOREIGN PATENT DOCUMENTS

WO    WO 01/07290 A1    2/2001

OTHER PUBLICATIONS

STIC EIC 3600 search report dated Feb. 28, 2018. (Year: 2018).*
(Continued)

*Primary Examiner* — Kevin P Mahne
(74) *Attorney, Agent, or Firm* — Barnes & Thornburg LLP; G. Peter Nichols

(57) ABSTRACT

An apparatus is disclosed which is operable to detect and identify vehicles, where individual vehicles each have at least one RFID communication device mounted thereon close to the surface on which the vehicle travels, and a vehicle's RFID communication device(s) is/are operable to transmit to the apparatus a signal indicating that vehicle's identity, the apparatus including an RFID reader, the RFID reader having an antenna which is operable to be positioned on or in the surface on which the vehicles travel, and the antenna (which may be an "adapted dipole" antenna) is operable to transmit a signal to a vehicle's RFID communication device(s) and to receive a backscattered modulated signal from a RFID communication device on that vehicle indicating that vehicle's identity, such that that vehicle is thereby detected and identified by the apparatus.

16 Claims, 26 Drawing Sheets

(51) Int. Cl.
    *G08G 1/01* (2006.01)
    *G08G 1/015* (2006.01)
    *G08G 1/04* (2006.01)
    *G08G 1/052* (2006.01)
    *G06K 7/00* (2006.01)
    *G01S 13/92* (2006.01)
    *G01S 13/86* (2006.01)

(52) U.S. Cl.
    CPC ........... *G08G 1/015* (2013.01); *G08G 1/0116* (2013.01); *G08G 1/04* (2013.01); *G08G 1/052* (2013.01); *G01S 13/867* (2013.01); *G01S 13/92* (2013.01); *G06K 7/0008* (2013.01); *G08G 1/0175* (2013.01)

(56) References Cited

U.S. PATENT DOCUMENTS

| | | | | |
|---|---|---|---|---|
| 6,045,652 | A * | 4/2000 | Tuttle | G01S 13/758 156/278 |
| 6,108,539 | A * | 8/2000 | Ray | H04B 7/18506 455/427 |
| 6,300,920 | B1 * | 10/2001 | Pertl | H01Q 7/00 343/742 |
| RE42,773 | E * | 10/2011 | Tuttle | G01S 13/758 235/380 |
| 9,127,964 | B2 * | 9/2015 | Schwarz | G01D 4/002 |
| 9,824,249 | B2 * | 11/2017 | Louzir | G06K 7/10346 |
| 9,859,614 | B2 * | 1/2018 | Almog | H01Q 1/521 |
| 2002/0101332 | A1 | 8/2002 | Talmadge | |
| 2003/0197653 | A1 * | 10/2003 | Barber | H01Q 1/36 343/742 |
| 2004/0189493 | A1 * | 9/2004 | Estus | B60R 13/10 340/988 |
| 2005/0007293 | A1 * | 1/2005 | Handelsman | H01Q 7/005 343/867 |
| 2006/0261938 | A1 * | 11/2006 | Lai | G06K 7/0008 340/505 |
| 2007/0279231 | A1 * | 12/2007 | Cheng | G06K 19/07786 340/572.7 |
| 2008/0061937 | A1 * | 3/2008 | Park | G06K 7/0008 340/10.1 |
| 2008/0150692 | A1 * | 6/2008 | Missimer | G06K 7/0008 340/10.1 |
| 2009/0184827 | A1 * | 7/2009 | Petropoulos | G06K 7/10336 340/572.7 |
| 2009/0231142 | A1 * | 9/2009 | Nikitin | G06K 7/0008 340/572.8 |
| 2009/0231161 | A1 * | 9/2009 | Malarky | G07B 15/063 340/933 |
| 2009/0309704 | A1 * | 12/2009 | Chang | H04Q 9/00 340/10.1 |
| 2010/0123559 | A1 * | 5/2010 | Wilkinson | G06K 7/0008 340/10.4 |
| 2011/0148581 | A1 * | 6/2011 | Chamseddine | G06K 7/0008 340/10.1 |
| 2011/0243201 | A1 * | 10/2011 | Phillips | H01Q 21/007 375/219 |
| 2012/0268308 | A1 * | 10/2012 | Tuttle | G01S 13/282 342/42 |
| 2013/0049925 | A1 * | 2/2013 | Subramanian | G06K 7/10079 340/3.1 |
| 2013/0120197 | A1 * | 5/2013 | Lin | H01Q 1/38 343/700 MS |
| 2014/0229387 | A1 * | 8/2014 | Chow | G06Q 20/3829 705/71 |
| 2014/0267728 | A1 * | 9/2014 | Dahlin | H04N 7/188 348/148 |
| 2014/0334684 | A1 * | 11/2014 | Strimling | G06K 9/00771 382/105 |
| 2015/0243165 | A1 * | 8/2015 | Elsheemy | B60R 25/00 340/906 |
| 2015/0294127 | A1 * | 10/2015 | Louzir | G06K 7/10346 340/10.1 |
| 2017/0229758 | A1 * | 8/2017 | Tuttle | H01Q 1/2208 |
| 2017/0257731 | A9 * | 9/2017 | Wilkinson | H04W 4/008 |

OTHER PUBLICATIONS

Search Report in corresponding European Application No. 15779561.8, dated Apr. 6, 2017, 3 pages.
Office Action in corresponding European Application No. 15779561.8, dated May 16, 2017, 5 pages.
International Search Report dated Jun. 9, 2015 out of PCT priority Application No. PCT/AU2015/050161 (3 pages).
Written Opinion dated Jun. 9, 2015 out of PCT priority Application No. PCT/AU2015/050161 (5 pages).
Written Opinion dated Feb. 24, 2016 out of PCT priority Application No. PCT/AU2015/050161 (5 pages).
International Preliminary Report on Patentability dated Sep. 12, 2016 out of PCT priority Application No. PCT/AU2015/050161 (5 pages).
Kumar et al., "RFID and Camera-based Hybrid Approach to Track Vehicle within Campus", 2009 International Symposium on Computing, Communication, and Control (ISCCC 2009), Proc. of CSIT, vol. 1, 2011, pp. 207-213 NPL reference No. XP055233163.
Uddin et al., "UHF RFID antenna architectures and applications", Scientific Research and Essays, vol. 5 (10), pp. 1033-1051, May 18, 2010 Available online at http://www.academicjournals.org/SRE ISSN 1992-2248 © 2010 Academic Journals.

* cited by examiner

VEHICLE IDENTIFICATION AND/OR MONITORING SYSTEM

This application claims priority to International Application No. PCT/AU2015/050161 filed Apr. 9, 2015 and to Australian Application No. 2014901356 filed Apr. 14, 2014; the entire contents of each are incorporated herein by reference.

TECHNICAL FIELD

The present invention relates to, inter alia, the use of Radio Frequency Identification (RFID) technology, or RFID technology in combination with other technologies, in the detection of a vehicle, and/or the identification of a vehicle and/or the verification of a vehicle's identity. It is thought that the invention may be of particular use in the context of road vehicles, especially road registered vehicles, for example, to detect vehicles behaving "out of norm" or contrary to road rules, or to detect vehicles which have been misidentified (including where the vehicle's identity could not be verified) and/or which have failed to identify themselves, etc. This may help to facilitate, for example, immediate roadside intervention where necessary or appropriate. However, no particular limitation is to be implied from the above, and the invention could potentially be used in a wide range of other areas as well. By way of example, the invention could potentially find use in the context of railway vehicles, or vehicles used in non-road applications such as mine sites or industrial sites, etc. Nevertheless, for convenience, the invention will hereafter be described with reference to, and in the context of, road registered vehicles such as cars, trucks, buses, motorcycles, etc.

It is to be clearly understood that mere reference herein to previous or existing devices, apparatus, products, systems, methods, practices, publications or any other information, or to any problems or issues, does not constitute an acknowledgement or admission that any of those things individually or in any combination formed part of the common general knowledge of those skilled in the field, or that they are admissible prior art.

In the context of the present invention, "vehicle identity" will typically be determined with reference to (or from) one or more unique identifier(s) specific to an individual vehicle. Typically the unique identifier(s) will be (or will include) the registration (or number plate) number, although the identifier(s) may also be (or include) any combination of additional/other information describing or relating to the vehicle, its appearance, other vehicle identification codes or indicia, use parameters and/or an identifier of the device or media containing the "vehicle identification".

SUMMARY OF THE INVENTION

In one broad form at least, the present invention relates to an apparatus which is operable to detect and identify vehicles, where individual vehicles each have at least one RFID communication device mounted thereon close to the surface on which the vehicles travel, and a vehicle's RFID communication device(s) is/are operable to backscatter a modulated signal to the apparatus indicating that vehicle's identity, the apparatus including an RFID reader, the RFID reader having an antenna which is operable to be positioned on or in the surface on which the vehicles travel, and the antenna is operable to transmit a signal to a vehicle's RFID communication device(s) and to receive the modulated backscattered signal from a RFID communication device on that vehicle indicating that vehicle's identity, such that that vehicle is thereby identified by the apparatus, wherein the radiation pattern of the antenna has a wide and low (flattish) shape relative to the surface on which the vehicles travel.

If the apparatus detects an unmodulated backscattered signal from a vehicle (or from the body of the vehicle etc) in the absence of a modulated signal from a RFID communication device on that vehicle, that vehicle is thereby detected but not identified by the apparatus, and this indicates that a RFID communication device on that vehicle may be absent or not functioning correctly.

The antenna of the apparatus's RFID reader may have a radiation pattern that is non-directional (or directionally independent) relative to the surface on which the vehicles travel. The antenna of the apparatus's RFID reader may be configured for use on or in the surface on which the vehicles travel and to provide a radiation pattern the shape of which is wide and low (flattish), preferably generally toroidal or more preferably a wide low elliptic torus. Such a radiation pattern may be compared to (contrasted with) the generally long and focused/directed radiation pattern of a conventional RFID read antenna. And if the antenna's radiation pattern is non-directional (or directionally independent) relative to the surface on which the vehicles travel, this may provide the benefit of alleviating the need to correctly orient the antenna of the apparatus's RFID reader when the apparatus is being deployed/installed/positioned for use. The antenna may be capped to reduce the blinding affect (discussed further below).

In some preferred embodiments, the power of the RFID reader antenna may be concentrated in a region a close to but above (e.g. approximately 200 mm to 1200 mm above) the surface on which the vehicles travel, and this region may correspond to the range of heights within which RFID communication device(s) are mounted on vehicles.

Very often (although certainly not necessarily exclusively), the apparatus will be used in applications where the vehicles are road registered vehicles, the RFID communication device(s) on a vehicle are mounted on or in one or more of the vehicle's number plates, and the apparatus's RFID reader, including its antenna, is operable to reside on the road surface or to be installed in the surface of the road.

In such road applications, the apparatus's RFID reader, when face-on to the RFID communication device on/in a vehicle number plate, may have a read range of approximately 6 m to 10 m. The apparatus's read-zone for reading the RFID communication device on a vehicle's number plate may begin approximately 5 m before the RFID reader antenna and end approximately 5 m beyond the RFID reader antenna in the vehicle's direction of travel along the road. The apparatus's read-zone may be approximately 4 m wide. A space from approximately 1 m before the RFID reader antenna to approximately 1 m to beyond the RFID reader antenna in the vehicle's direction of travel may be excluded from the read-zone (this may help to alleviate problems associated with blinding and read-angle difficulties). Often, the read-zone may be approximately 100 mm to 1500 mm, and more often 200 mm to 1200 mm, above the road surface (as indicated above, this may correspond to the range of heights within which RFID communication device(s) are mounted on vehicles).

The apparatus may have radar capability. The apparatus may thus be operable (using radar or variable/differential radar) to perform one or a combination of the following: detect the speed and/or position of a vehicle, and obtain a moving radar cross section of the vehicle.

The apparatus may further be operable to perform one or more of the following: determine the length and/or axel count of a vehicle, generate a radio fingerprint of a vehicle, and communicate wirelessly with a controller located remotely of the apparatus.

The apparatus may also include an imaging device located on or in the surface on which the vehicles travel. The imaging device may be operable to obtain still image(s) of a vehicle, or a portion of a vehicle, at the same time (at least approximately) as when the apparatus's RFID reader attempts to transmit and receive signals to and from that vehicle's RFID communication device(s) to identify the vehicle using RFID. The imaging device may be operable to obtain still image(s) of a vehicle, or a portion of a vehicle, when the vehicle is at one or more fixed distances from the imaging device. Image(s) of a vehicle obtained by the imaging device may be used to help verify whether the identity of a vehicle corresponds to the identity indicated in the backscattered modulated signal transmitted by the vehicle's RFID communication device(s) and received by the RFID reader. The imaging device may also be operable to assist in observation and or identification of a least certain vehicle behaviours.

In another possible broad form, the present invention relates to a system for detecting, identifying and/or monitoring vehicles, where individual vehicles each have at least one RFID communication device mounted thereon close to the surface on which the vehicles travel, and a vehicle's RFID communication device(s) is/are operable to backscatter a modulated signal indicating that vehicle's identity, the system including at least one apparatus of the kind described above, and a controller in communication with the said apparatus(es).

Where the system includes multiple of the said apparatuses, two or more of the apparatuses may be operable to communicate and synchronise with one another, or the system may be operable to synchronise two or more of the apparatuses, such that the antenna radiation patterns of the said two or more apparatuses (as a synchronised group) function, in effect, as a single wider radiation pattern.

Very often (although certainly not necessarily exclusively), the system will be used in applications where the vehicles are road registered vehicles and the RFID communication device(s) on a vehicle is/are mounted on or in one or more of the vehicle's number plates. In such applications, the system may include one or more stations at different road locations, and each station may have one or more apparatuses or a synchronised group of apparatuses, and the controller which is in communication with the said apparatuses may be a local roadside controller. Each station (or its roadside controller) may be in communication with a remote system controller.

One or more stations may include a traffic camera operable to facilitate observation of vehicle behaviour or to facilitate tracking of vehicles as image objects. One or more stations may also include a weather station.

The roadside controller of a station may be operable to communicate with the roadside controller of one or more other stations. The roadside controller of a station may use information from the roadside controller(s) of one or more other stations, information from the remote system controller, and/or data from its own one or more apparatuses or synchronised group of apparatuses, to detect at least certain vehicle behaviour. The roadside controller of a station may communicate its observations of vehicle behaviour to the roadside controller(s) of one or more other stations and/or to the remote system controller. The roadside controller of a station may communicate its observations of an observed vehicle behaviour, and/or of the vehicle's identity, to a law enforcement vehicle or personnel located on the vehicle's predicted route of travel.

Any of the features described herein can be combined in any combination with any one or more of the other features described herein within the scope of the invention.

BRIEF DESCRIPTION OF THE FIGURES

Preferred features, embodiments and variations of the invention may be discerned from the following discussion entitled "Background To, Motivations For, And Description Of, The Invention" which provides sufficient information for those skilled in the art to perform the invention. The discussion given under the heading "Background To, Motivations For, And Description Of, The Invention" is not to be regarded as limiting the scope of the preceding Summary of the Invention in any way, and it will make reference to a number of Figures as listed below.

Note that several of the Figures contain reference numerals identifying particular features or things depicted therein. Many of these reference numerals are also referred to in the discussion below. The way in which specific reference numerals in the Figures are referred to in the discussion below is that, for example, reference numeral 1 appearing in FIG. 3 will be referred to as "3-1", and likewise reference numeral 6 appearing in FIG. 21 will be referred to as "21-6", etc.

As illustrated in FIG. 3, such things include dirt 3-1 on the lens and/or on the window of the housing containing the camera 3-5, air impurities and air flow 3-6 (for example dust, smog or other particulates or impurities that reduce visibility in the air, especially when blown/moving, and also heat waves and the like which can create shimmering or haze), line of sight obstructions 3-4 in the path between the camera 3-5 and the vehicle/object 3-3 (such line of sight obstructions might even be on the vehicle, e.g. obscuring or partly obscuring the number plate) and dirt or other impurities on the vehicle's number plate 3-2. It will be easily appreciated that clarity generally decreases with increase in the distance between the camera 3-5 and the vehicle/object 3-3.

In FIG. 9, the depicted vehicle is a distance (4 m) from the sensor.

BACKGROUND TO, MOTIVATIONS FOR, AND DESCRIPTION OF THE INVENTION

Figure 1A:
FIGS. 1A-1I illustrates a display that may be typical of a traffic control room scenario with multiple (in this case nine) concurrent incoming video streams from different wide angle traffic cameras at different locations. While the text on the photographs is illegible, the information is not material to the present invention; but merely provides the source and date/time information of the photograph.
Figure 1B:
Figure 1C:
Figure 1D:
Figure 1E:
Figure 1F:
Figure 1G:
Figure 1H:
Figure 1I:

In most countries, vehicles such as cars, trucks, buses, motorcycles, etc, must be validly registered in order to be lawfully driven on public roads. Such vehicles are also generally required to be identifiable on and off the road, including by humans (e.g. by police or traffic authority personnel, and even by members of the general public) without the use of electronic devices. Hence, vehicles should generally be identifiable (on and off the road) by simple visual inspection. For this purpose, vehicles have been required to display vehicle plate numbers since around 1900, after a public outcry resulting from the first recorded motor vehicle fatality which happened on 13 Sep. 1899.

After its introduction, the vehicle plate number became a trusted means to positively identify a vehicle. However, gangsters like Al Capone infamously started a trend as early as the 1920s to use tampered, obscured, copied and stolen number plates to hide a vehicle's identity. This gave rise to a requirement to also verify the authenticity of a vehicle number plate.

Additional registration documents therefore came into use to aid in the verification of the vehicle identity displayed on the number plate. However to inspect these documents, a vehicle needs to be pulled over and stopped. Initially the small number of vehicles on public roads made this stop-and-go inspection highly effective, leading to a general trust that the plates displayed on vehicles were indeed correct, genuine, lawful and on the correct vehicle.

However, in recent times, in many (if not all) parts of the world, vehicle ownership has increased dramatically. Consequently, the number of registered vehicles being driven on public roads has also dramatically increased. This has led to increased traffic, congestion and traffic transgressions, which have in turn resulted in a marked decrease in traffic efficiency and road safety.

At the same time, increases in traffic volume, congestion, etc, have made it far more difficult to verify the identity of a vehicle and to execute a corrective or law enforcement action (where required). For instance, the time and space required to stop and inspect vehicle number plates and registration documents (i.e. for individual vehicles) has dramatically reduced the percentage of vehicles on the road that are inspected, so much so that nowadays many vehicles may never be inspected during their lifespan. This therefore increases the reliance placed on the vehicle number plate to positively identify a vehicle. This general trend is made evident in parts of Australia (for example) where an additional registration document, which previously was required to be displayed in a vehicle windscreen (or at some other appropriate location on the vehicle for motorcycles, trucks, etc), is no longer used.

Today vehicle number plate imaging methods are often used to automate the identification of vehicles on the road. RFID identification methods (using both passive and active RFID) are also currently in use, although presently RFID is primarily used for toll and congestion charging.

However, the above-mentioned RFID-based systems (used for tolling etc), and likewise the above-mentioned systems which use imaging to perform vehicle identification, generally do not verify the authenticity of the vehicle identity at the time of recording the identity. Rather, they typically do so "after the fact" at a later time/date. As such, if the vehicle identity detected by an RFID or imaging based system turns out to not actually be the correct identity for the vehicle in question (e.g. due to an error by the automated vehicle identification system, or due to a deliberate attempt to disguise the vehicle's identity), this fact often is not identified until later, and often there may be little that can then be done to determine the correct identity of the vehicle. Finding misidentified vehicles, or vehicles which are not identified at all, therefore remains a problem.

Driver behaviour is a major contributing factor influencing traffic and road safety, within given infrastructure and demographic constraints. Driver behaviour is often evident (and observable) from the observable behaviour of a vehicle (especially for negative driver behaviours such as speeding, weaving, tailgating, etc). As an example of this, observed swerving, weaving, or erratic behaviour of a vehicle may indicate (or at least give reason for suspicion) that the driver is driving the vehicle whilst intoxicated (and hence unlawfully). "Out of norm" or "vehicle behaviours not in compliance with road rules" like this have a negative impact on traffic, traffic control and road safety in general.

It is thought that the ability, and/or the perception of the ability, to avoid being identified (e.g. the belief by a driver of a vehicle that their vehicle may be able to avoid identification) leads to an increase in negative driver behaviour. This phenomenon is a common human behaviour, as described in the field of Crowd Psychology, where anonymity within a crowd may lead to opportunistic negative behaviour.

Currently, vehicle behaviour is mostly observed and acted upon by humans. In terms of observation of vehicle behaviour (recall that vehicle behaviour is often indicative of driver behaviour), an instance of negative vehicle behaviour may be observed directly by a human (e.g. a police officer or another road user present at the scene may directly witness/see an instance of negative vehicle behaviour) or the observation may be made by a human who is at a remote location via one or more traffic cameras. The use of traffic cameras, however, requires positive identification of the vehicle for intervention actions. Therefore, in instances where negative vehicle behaviour is observed via a traffic camera but the vehicle concerned is not identified, or it is misidentified, the infringement often goes unprosecuted.

Based on the above, it appears that effective traffic management, and/or traffic planning and/or road planning and/or law enforcement may require at least one, and possibly a combination of the following: vehicle presence detection, vehicle identification (or vehicle identification detection), verification of vehicle identity, and vehicle behaviour detection, at a given time and given place (preferably for as many occurrences as feasible, and preferably in an appropriate combination as required by the use case).

From above it will also be appreciated that, for many reasons, there is an increasing need to be able to detect vehicles (whether individual vehicles or groups/densities of vehicles), and also to be able to identify and verify the identity of a detected vehicle. In this regard, studies indicate that the vehicle identification and verification accuracy should preferably be around 99.99% (i.e. a tolerance of one "missed" detection/identification/verification instance in every 10,000 vehicles is considered acceptable). Currently however, the figure for automated vehicle identification accuracy in ITS (intelligent transportation system) applications appears to be around 95%, even using both imaging and radio methods (this equates to a surprising and unacceptably low tolerance of one missed detection/identification/verification instance in every 20 vehicles).

It is thought that it may be desirable to provide an automated method/system, possibly combining various technologies, to detect, identify, and/or verify the identity of a vehicle, and it may also be desirable to alert a local human (and/or possibly an automated system) of the detection of vehicles which are misidentified, or not identified at all, for either immediate intervention or so that such vehicles can be electronically "tracked" to a point where intervention/prosecution may take place. This may enable vehicles which are detected and observed as behaving out of the norm and/or which have provided a suspicious identity (or no identity) to be differentiated from detected vehicles for which the behaviour is determined to be non-transgressional (within the norm) and for which the identity is verified as valid. It is thought that, if this can be achieved, this may result in higher compliance in terms of positive vehicle identity detection and verification and consequently increased positive road behaviour. It is also hoped that opportunities for vehicle detection avoidance may be reduced. Focussing on (and hopefully enabling) the facilitation of immediate (or more rapid, more targeted or more sophisticated) intervention may also reduce time and cost of limited resources spent by the authorities on "after-the-fact" identification and verification of identity of vehicles. It may also be desirable if such a system could be capable of easy and/or rapid and/or cost-effective deployment in fixed and/or temporary scenarios.

The need for automatic vehicle detection and identification for the enforcement of road rules etc (e.g. to catch instances of speeding, red light running, etc), for road and traffic planning and for automatic traffic management mechanisms (e.g. tolling, ramp metering, dynamic speed limits, etc) has already given rise to a range of innovations dealing with automated vehicle detection, classification and identification. Previously-proposed automated detection methods can largely be grouped into certain categories; these categories include: vehicle presence detection (for example using magnetic loops, RADAR and lasers), vehicle imaging (for example number plate recognition), wireless data exchange (for example V2X) and Radio Identification (better known as RFID). "Wireless" and "RFID" are both radio technologies, however a distinction between them is drawn due to the difference in distances over which they generally operate. Wireless is generally a comparatively long-range radio technology (i.e. it is operable at comparatively greater distances) whereas RFID is generally a comparatively short range radio technology (i.e. operable at comparatively short distances). Wireless read range is typically many times greater than RFID read range. The separation point between the operation of wireless technologies and RFID technologies is often approximately the linear space a moving vehicle occupies on the road (i.e. the vehicle length plus the minimum gap to the next vehicle).

Of the categories of previously proposed automated technologies discussed above, the one with perhaps the longest history is vehicle presence detectors. Vehicle presence detection involves recognising the presence of one or more vehicles, but without uniquely identifying or verifying the identity of that/those vehicle(s). Vehicle detection is nevertheless important, for example, for traffic and congestion management, road planning, etc. Vehicle presence detectors are typically used on their own to count the number of vehicles passing a certain point, or the number of vehicles passing a certain point at (or within) a given time. Vehicle presence detectors have therefore been used to record information on vehicle speed, traffic flows, volumes and densities, as well as information such as vehicle weight, vehicle types (e.g. axle counts), etc. Today vehicle presence detectors are sometimes used in conjunction with imaging to further enhance vehicle type detection and even to identify the vehicle by the vehicle number plate (and/or using other details pertaining to the vehicle which may be discernible from an image thereof).

Imaging technologies are in common use in many parts of the world in traffic management systems. For example, in many jurisdictions an image must accompany a traffic infringement notice/fine. Therefore, in such a jurisdiction, if (say) a vehicle is detected speeding by a laser or radar speed sensor, imaging technology is also required to provide an image/photograph of the vehicle at the time of the detected transgression, so that the image/photograph can accompany the infringement notice as evidence of the transgression. Various proposals have been made to combine the detection and imaging functions into single units which can be, for example, handheld or mounted in a fixed location. By way of illustrative example, PCT/US1998/020857, U.S. Ser. No. 12/367,961 and PCT/GB2005/000848 discuss various methods to place and use an imaging device in observing vehicles.

Imaging is also used to observe traffic in real-time, typically using wide angle video transmitted to a control room. FIGS. 1A-1I illustrate a display that may be typical of a traffic centre control room scenario with multiple (in this case nine) concurrent incoming video streams from different wide angle traffic cameras at different locations. It is possible for a human (e.g. an officer in the control room who is observing the live traffic video feeds) to detect anomalies in driver/vehicle behaviour and traffic conditions from these video feeds. It is, however, not generally possible to identify vehicles from these video feeds. Nevertheless, a vehicle, as an anonymous object, can be tracked in such video feed.

Figure 2:
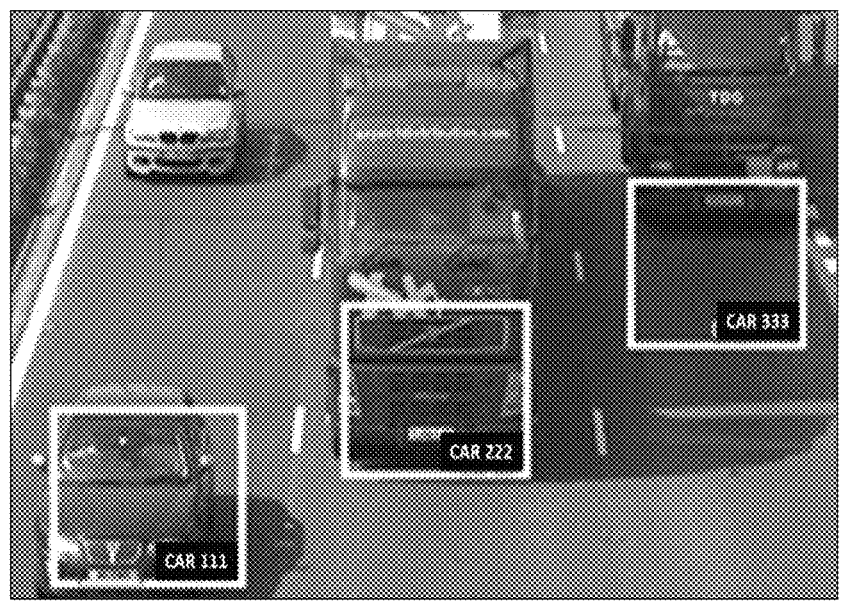
FIG. 2 shows an image from a narrow angle, high definition camera with the ability to read vehicle number plates over more than one road lane.

On the other side of the spectrum, narrow angle lenses are often used to identify a vehicle by locating and reading the plate in an image (this may often require the use of quite sophisticated optical character recognition technology) as depicted in FIG. 2.

Modern high quality (and high-resolution) cameras may potentially have the ability to combine the two types of observations discussed above. The success of such combined vehicle identification (performed by reading the plates from video/image data) and behaviour detection (again based on video data) is, however, limited since traffic behaviour observation/detection requires a wide image with forgiving sharpness and clarity (typically this requires a wide-angle lens/camera), whilst plate identification on the other hand requires sharp, high contrast images and typically this requires a narrow angle lens/camera with a clear/unobstructed sight line between the camera and the plate. These requirements result in high technological complexity and substantial cost in the application of imaging technologies.

Imaging is therefore highly versatile, but also has many limitations. This makes it very useful, but not necessarily able to provide a complete solution to all of the issues that may be associated with vehicle/traffic monitoring and/or management and/or law enforcement. One of the most significant limitations associated with imaging is the inability to use an image to verify that a number plate is, in fact, genuine (i.e. to verify that the plate visible in the image is actually the compliant, lawfully applied plate that it appears to be). All types of images, whether in visible or invisible light, can unfortunately be fooled. For example, camera detection, even where textured and image-shift security marks are used, is not reliable.

Figure 3:
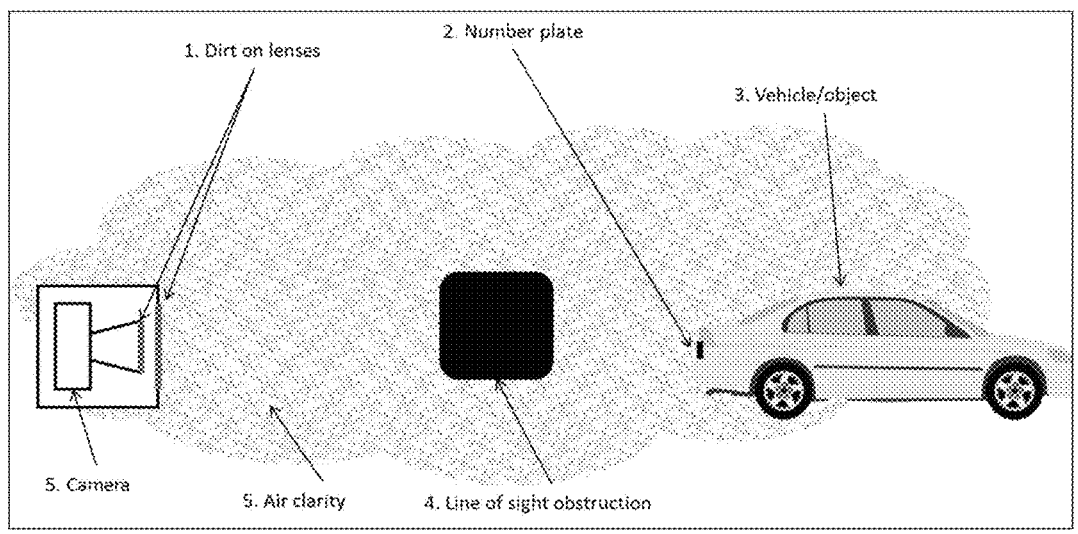
FIG. 3 schematically illustrates a number of things which influence the clarity of an image obtained by a vehicle imaging device (e.g. a traffic camera).
Figure 4:
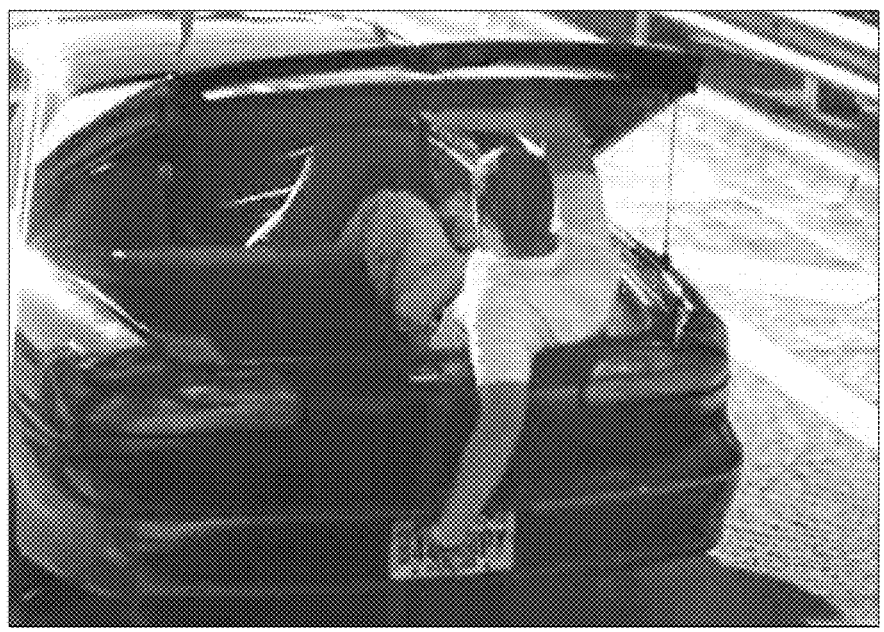
FIG. 4 is a photographic illustration of an instance where a car passenger hides in the back/trunk of the car, then reaches out to cover the license plate with his hand (in order to avoid identification of the vehicle by imaging) as the car travels past a traffic camera or toll point.

In practice, there are also other issues that impose significant limitations on the use of imaging technologies. These include obstructions, lens cleanliness, changing light conditions and air quality, etc, all of which tend to reduce the clarity of an image, as represented in FIG. 3. Image clarity is a key factor in the ability to read plates (and hence identify vehicles) from an image. Longer image ranges allow for vehicle behaviour detection, but limit the ability to read the plate numbers reliably because of the associated reduction in clarity (and also due to the greater possibility for visual line of sight obstructions). Shorter ranges give better control over lighting and clarity, however things like rain and dust, for example, will still impair the reading. Short ranges also limit the ability to detect vehicle behaviour. Image detection systems often combine more than one camera to allow long range vehicle detection and short range plate reading. In sophisticated cases, the short range camera follows the vehicle until the plate is read or goes out of view. Telescopic and zoom lenses also allow this "short range" to be stretched to a narrow beam long range. These systems are, however, complicated making them expensive to deploy and maintain. Also, in general, cameras and lenses require a high level of maintenance. This is especially true for automatic number plate reading cameras, due to their high level of sophistication and the requirement for accuracy.

In most scenarios, imaging requires less than one millisecond and a clear view (i.e. an unobstructed line of sight) to capture the vehicle and the plate. However, even choosing the right moment to record the image requires highly sophisticated systems.

Using a stationary camera to image moving vehicles almost invariably involves some degree of image blurring. For instance, even using a fast camera shutter speed of $1/1000^{th}$ of a second, a vehicle travelling at 36 km/h will travel 10 mm while the camera shutter is open, and a vehicle travelling at 180 km/h will travel 50 mm while the camera shutter is open. This travel of the vehicle while the camera shutter is open results in blurring of the image captured by the camera (and the greater the amount of travel while the camera shutter is open, the greater the blurring). The characters appearing on vehicle number plates are typically 10 mm in width. Naturally, recognition/reading of a plate becomes impossible if blurring is too great.

Figure 14:
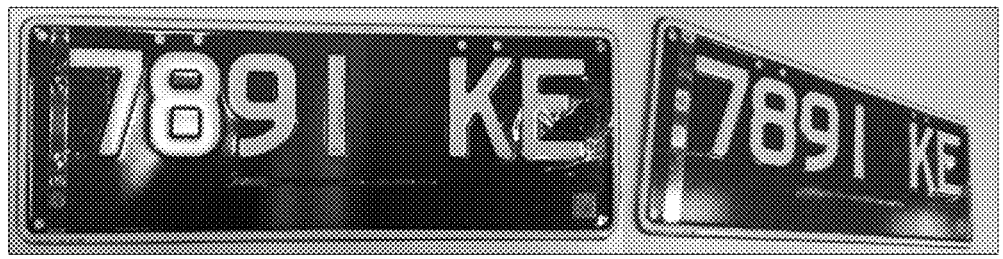
FIG. 14 illustrates the perspective image distortion that occurs when a vehicle number plate is viewed from an angle rather than face-on. This distortion, combined with the blurring effect associated with vehicle motion, necessitates that a traffic camera view angle should be face-on (or at least close to face-on). This requirement in turn results in an increase in the necessary read distance, due to the location/position at which a camera must be positioned in order to be out of the way of traffic but still obtain a "face-on" view of vehicle number plates, and the increase in necessary read distance further leads to an increase in the potential for view obstruction (see FIG. 3 for example).

The blurring effect discussed above may be sufficiently insignificant to be acceptable (or it may even be negligible) when the image is taken face-on (and from an appropriate distance), but as the angle increases (to one side or other relative to directly "face on") the image distorts in perspective and the characters appear to narrow/converge. This is illustrated in FIG. 14, and this effect too can make the plate more difficult to read, especially for optical character recognition and other automated recognition systems. Cameras are therefore conventionally placed in a way (and at a location/position) so as to have a close to face-on angle, often over longer ranges. Even so, as has been mentioned, the longer ranges are often subject to problems such as higher possibility for line-of-sight obstruction, blurring due to air quality or rain etc (the greater the range, the greater is the amount of air pollution and rain etc in the space between the number plate and the camera lens), and these things all tend to reduce imaging read performance.

Thus, in summary, there are a number of difficulties associated with the use of imaging (at least when used alone) for vehicle detection and identification, and imaging (alone) is generally unable to perform vehicle identity verification at all.

Radio technologies, including the "wireless" and "RFID" technologies mentioned above, have the ability to authenticate, not only an RFID tag (which may preferably be located on a vehicle number plate, as discussed below), but also the RFID reader which reads the tags. The reason for this is that these radio technologies require an "intelligent" device on both sides of the identification; i.e. at the tag (on the vehicle/plate) and also at the reader. Those skilled in this area will understand that cryptography with challenge response methodologies may be used to perform identity verification of both an on-vehicle device (e.g. a RFID tag on a vehicle's number plate) and of a roadside RFID reader. A number of systems have been proposed which use radio technologies to identify and verify a radio device on a vehicle, which in turn identifies the vehicle.

Where radio technologies are used, a reader is generally an integral part of the system which performs vehicle identification using the radio technology. It is also generally possible for a reader (or its operation) to be verified (e.g. checked for unauthorised tampering and/or to ensure proper operation). However, the same unfortunately cannot always be said for, for example, on-plate or on-vehicle radio devices (like RFID tags) which transmit vehicle identity. For instance, it may be difficult to prove that (or determine whether) the device transmitting a vehicle identity is in fact on the vehicle it seems/claims to be on, since radio waves are invisible and radio readers cannot "see" the origin of the wave, especially with ranges of more than a vehicle length. Radio technologies also have another drawback in that, whilst radio technologies can be used to identify vehicles, they are generally unable to monitor/assess vehicle behaviour (whether this is the behaviour of a single vehicle or the behaviour of numerous vehicles on a macro/traffic level). Therefore, radio technologies, it is thought, might be used in conjunction with imaging to try and overcome or reduce these limitations.

Whilst radio technologies are often used (and are quite well suited) for verifying vehicle identity, they are not entirely invulnerable to so-called "identity spoofing". In identity spoofing, typically, the RFID or other radio technology device on a vehicle is altered or replaced so as to provide a different (and/or possibly a changing) identity in order to avoid detection or to fool the detector into thinking that the vehicle is actually a different vehicle. Wireless radio technologies are often more vulnerable to such tampering (more so than RFID technology for example) since wireless systems typically form part of a complex computer unit, for example the vehicle on-board computing unit. In the case of wireless radio technology, because of the longer read ranges, the use of imaging usually cannot aid in detecting such tampering. On the other hand, the close-to-line-off-sight and well defined radiation pattern of passive backscatter UHF RFID tags/transmitters may allow imaging methods to support the detection of such tampering. In extreme cases, however, even a passive backscatter UHF RFID tag may be disabled, and whilst a visual/image confirmation could make an observer believe it is the observed tag which transmits the signal, in fact another tag or spoofing device may be generating the identification signal. This is, however, much easier to do with active longer range wireless radio identification devices than with close-to-line-of-sight backscatter RFID devices. The use of a short range focussed RFID reader, with the RFID tag placed on or in a metal plate, may also help to alleviate this extreme example (this kind of identity verification might, for example, be performed in a stop and go check point, e.g., by a traffic officer using a hand held RFID reader).

"Wireless" radio technologies (e.g. GSM, Bluetooth®, ZigBee®, Wi-Fi™, etc) are increasingly being used to track vehicles, by tracking devices in the vehicle, for example hands-free kits and/or mobile phones, and for vehicle to roadside and vehicle to vehicle communications. Wireless is typically used to understand vehicle routes against location and other people demographics, e.g. for purposes of infrastructure and traffic planning. For example, mobile phone based wireless technologies track the phones of people in vehicles. Wireless use (more specifically IEEE 802.11p or WAVE) is aimed at road safety and "real-time" vehicle directed controls, for example, utilising object locality to avoid the area of an accident and/or to set up groups of vehicles to travel together as a unit. In the latter example, vehicle identity is of lower importance and in fact, from a privacy viewpoint, vehicle identity detection may not be desirable. (The idea is similar to travelling by bus; people queue, pay and take seats, but no names are required.)

As mentioned above, wireless is a comparatively long range technology. Consequently, a wireless receiver may be able to detect and identify a vehicle, but it cannot know if a vehicle was not detected. There may also be a number of other difficulties, as illustrated by the following example. Consider a camera that is also equipped with a (or has an associated) wireless device that can wirelessly identify a vehicle at a range of 100 meters. Such a wireless device could potentially detect and identify a vehicle anywhere on a 200 m stretch of straight road (i.e. anywhere within 100 m on either side of the device/camera). Assume that on this 200 m stretch of road there may be as many as, say, 20 moving vehicles per lane. Let us assume also that the radiation pattern does not fluctuate. The 200 meter stretch of road can be marked with visible paint or other markers (to assist the imaging performed by the camera—the marked area is "visible" to the camera). Now let us say that one of the many vehicles in the marked area does not wirelessly send its vehicle identity (ID). In this scenario (with the idealistic assumption of a non-fluctuating radiation pattern) the system can know (from what the camera sees) that there is one vehicle that is not transmitting its ID, but it cannot know which vehicle it is. In other words, there will be one fewer wirelessly received vehicle IDs than there are vehicles visible to the camera at the time, but the system cannot determine which of the vehicles is not transmitting its ID. The system will also not be able to detect a vehicle that is, for example, driving too fast, even though the camera can "see" the fast-moving vehicle, because the long-range wireless device cannot determine which individual vehicle (of the many vehicles in the marked area) is the fast-travelling one. Consequently, whilst the camera can identify that there is a vehicle which is driving too fast, even with the additional ability to identify vehicles using wireless technology, it is not possible to identify which vehicle is the one that is speeding, so no infringement notice can be issued. This kind of problem is compounded when it is considered that, in reality, the radiation pattern fluctuates, and vehicles move around (switch lanes, accelerate or slow relative to one another, etc). Wireless technologies are therefore not suited for the purpose of positively identifying a vehicle and will not be further discussed.

RFID technology, particularly passive backscatter UHF RFID technology, as described by ISO/IEC 18000-6C, is thought to be more suitable for use in vehicle identification in the present context. Passive backscatter RFID is, in fact, very similar in many ways to RADAR (the term "RADAR" originated from the acronym RAdio Detection And Ranging). RADAR essentially involves a radio signal transmitted by a sensor that is then reflected by the object to be observed and the reflected signal is interpreted by the sensor. In the case of RFID, the reader signal, and the "reflected" signal (e.g. from the RFID tag), are modulated to carry information between the reader and the tag, and between the tag and the reader, respectively. The effective read-zone is defined by the point at which the tag receives enough energy from the reader to switch on and communicate intelligently with the reader. This is a sharp edge due to the nature of digital electronics.

As mentioned above, RFID technology is already used for vehicle identification in tolling and vehicle access applications. It is thought that the ability of RFID technology to provide a well defined range and an effective read-zone of approximately one vehicle length may allow for the detection and identification of a vehicle (using RFID), and verification of the vehicle identity (as determined using RFID) may be performed utilising (perhaps among other things) imaging to read the plate and/or a "finger print" (i.e. other imageable vehicle indicia) of the vehicle.

Figure 5:
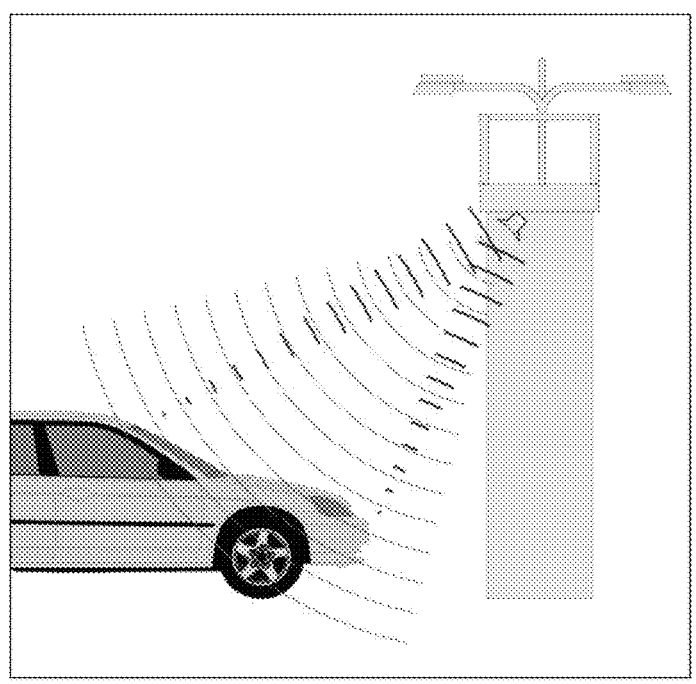
FIG. 5 illustrates, from the side, the use of an overhead gantry to read an RFID tag on a vehicle windscreen and a number plate.

FIG. 5 illustrates the use of an RFID reader, which is located on an overhead or over-road gantry, to read an RFID tag on a vehicle. (In fact, FIG. 5 illustrates the overhead reader reading tags located on the vehicle windscreen and number plate). The radiation pattern of the RFID reader depicted in FIG. 5 is narrow and well defined to cover approximately one vehicle footprint. A camera mounted on the same over-road gantry, in a similar position to the RFID reader, may be able to visually detect (and image) a vehicle which transmits no identity, or which transmits a wrong identity, to help in identifying the vehicle where the RFID system is unable to do so.

Figure 6:
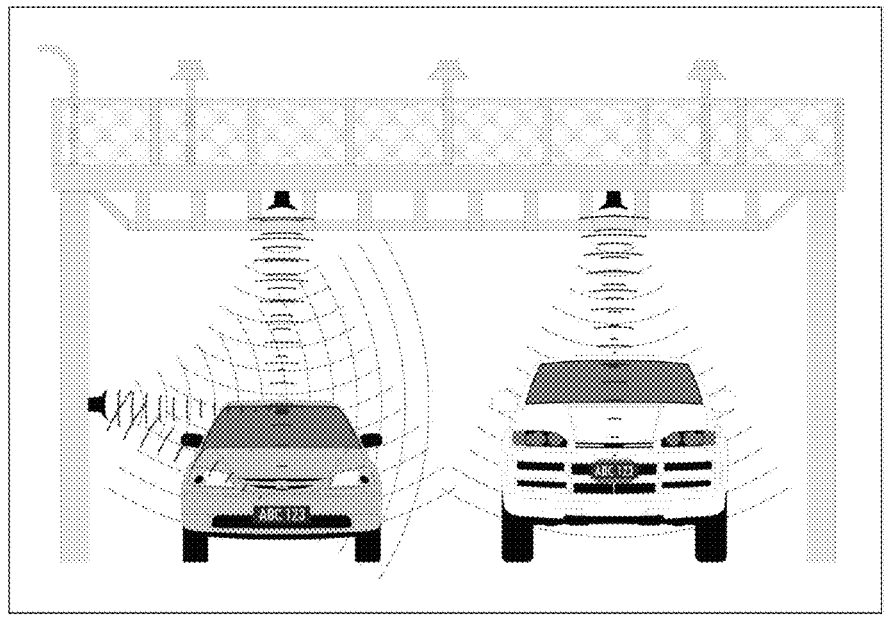
FIG. 6 illustrates an RFID overhead reader and a RFID side reader scenario, as seen down the road.

FIG. 6 illustrates an RFID overhead reader and side reader scenario, as seen down/along the road. Note that, normally, a side reader (i.e. a reader mounted at the side of the road) is limited to detecting vehicles in one lane only, namely the lane closest to the reader. This is because, due to technological limitations, the maximum reliable RFID read range is often approximately 6 m. Consequently, vehicles travelling in the next lane over may be too distant from the side reader to be reliably detected. Another factor which may contribute to this limitation is that the side reader may have difficulty detecting a vehicle in the next lane over if there is a vehicle in the near lane (i.e. the lane closest to the reader) which obstructs the RFID view of the next lane. It will also be appreciated that the same issue, namely a vehicle in the next lane over being obscured from view by a vehicle in the near lane, also affects side mounted cameras (i.e. cameras mounted at the side of the road) and their ability to image vehicles in more distant lanes.

Using a gantry to provide overhead or over-road placement of RFID readers, cameras, etc, may reduce or alleviate the issues discussed above (associated with obstructed view) which affect side-mounted readers/cameras. However, an over-road gantry is a fixed installation which almost invariably costs a large amount of money, firstly to produce, but also to deploy/install/erect and maintain (especially when one considers the personnel, equipment, organisation, preparation, traffic diversions, etc, required for this, and that a road may need to be partly or entirely closed during installation, repair or maintenance of the over-road gantry or of any equipment mounted thereon). Accordingly, despite the several advantages of overhead or over-road gantries discussed above (e.g. for allowing close to face-on imaging, etc), it is thought that it would be preferable to avoid or remove the need for over-road gantries due to the costs associated with them. Over-road gantries may also be inherently unsuitable for use in temporary or rapid deployment applications.

Another possible RFID reader position is in or on the road surface.

Figure 7:
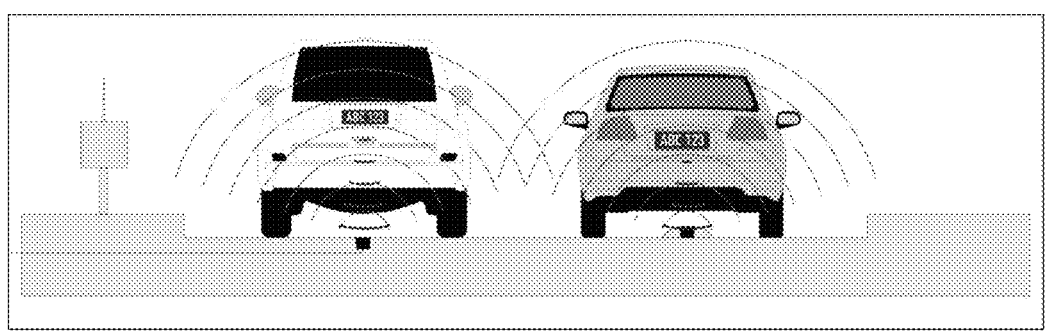
FIG. 7 illustrates an in-road RFID reader placement (left), and an on-road RFID reader placement (right), as seen down the road with FIG. 8 illustrating the latter as seen from the side.
Figure 8:
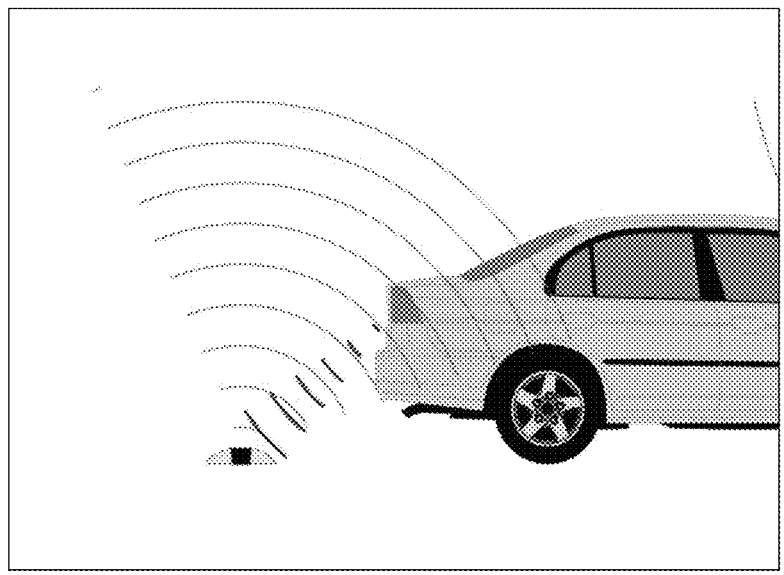

FIG. 7 illustrates both an in-road reader placement (on the left in FIG. 7) and an on-road reader placement (on the right in FIG. 7) as seen down the road, with FIG. 8 illustrating the on-road placement as seen from the side. Note that in both cases there is a clear line-of-sight between the reader and the vehicle number plate (where the RFID tag will preferably be located). In this regard, the likelihood of an object becoming positioned (i.e. creating a line of sight obstruction) between the reader and the plate/tag in these on-road and in-road reader scenarios (given the limited time available for this while the vehicle/tag is within read range of the reader) is extremely low or negligible. Also note the short distance required to read the plate. In this regard, it is significant that, due to the reliable read ranges possible with RFID technologies, it generally will not be possible, for example, for two vehicles that are travelling one behind the other to both be within the read range of a single RFID reader at the same time. As a result, a single RFID reader may only be able to detect/identify one vehicle travelling in a given direction at a time, and this may be beneficial as it may help to alleviate or reduce the problem discussed above, for example, where wireless technology is able to detect/identify multiple vehicles at a given time but cannot identify an individual vehicle (from amongst others) which is not transmitting its ID. With RFID technology that detects one vehicle at a time, if a vehicle is detected but it does not transmit its ID (or provides a suspicious ID), the system can immediately identify that it was THAT specific vehicle that did not transmit its ID (or provided a suspicious ID).

Figure 9:
FIG. 9 illustrates a sensor (the sensor includes a camera and an RFID reader antenna) which is positioned on the road.
Figure 10:
FIG. 10 illustrates the vehicle in FIG. 9, viewed from the point of view of the sensors camera (recall that the sensor is positioned on the road—see FIG. 9), with the vehicle again at the same distance (4 m) from the sensor as in FIG. 9.
Figure 11:
FIG. 11 is similar to FIG. 10 in that it illustrates the vehicle of FIG. 9, viewed from the point of view of the sensor's camera, except with the vehicle at a shorter distance (2 m) from the sensor.

FIG. 9 illustrates a sensor (it is a rough prototype, used for testing), which includes both a camera and an RFID reader, and which is positioned on the road, and there is a vehicle depicted a distance (4 m) away from the sensor. FIG. 10 illustrates the vehicle shown in FIG. 9, but viewed from the point of view of the sensor's camera (recall that the sensor is positioned on the road), and the vehicle is again at the same distance (4 m) from the sensor as in FIG. 9. FIG. 11 is the same as FIG. 10 except that it shows the vehicle at a shorter distance (2 m) away from the sensor. It will be appreciated from FIGS. 10 and 11 especially that an on-road sensor like the one shown in FIG. 9 (which includes a camera as well as an RFID reader) may be able to provide a clear image of the front (and/or possibly the back) of a passing vehicle. Such images may, for example, provide enough information to perform a rudimentary fingerprint of the front and/or rear of a vehicle, which may help to enable, for example, the detection of instances where a plate has been installed on the wrong vehicle. For example, if the RFID reader detects and identifies a vehicle, and the detected vehicle identity (as determined by RFID) corresponds to a small hatchback, but the image(s) from the camera on the other hand show that the plate (and the RFID tag thereon) from which the RFID detection/identification was made is actually installed on a large 4WD vehicle, then there is an immediate (albeit rudimentary) indication of the plate/tag being on the incorrect vehicle.

Figure 12:
FIG. 12 is a pictorial illustration of a form of negative vehicle/driver behaviour commonly referred to as "tailgating" which is sometimes used in an attempt to avoid identification by camera.

FIG. 12 illustrates a vehicle (namely the truck visible behind the small van in the centre lane) which is attempting to avoid identification by driving close to the vehicle in front. This is commonly known as tailgating, and the aim of the tailgater is to travel sufficiently close to the vehicle in front such that the front number plate on the tailgating vehicle is blocked from the view of a camera (e.g. a conventional overhead camera or side-mounted camera) by the vehicle in front. The distance between the vehicles in the centre lane in FIG. 12 is probably between 2 m and 4 m, even though the two may appear to be closer than this. The closeness at which tailgating occurs (i.e. how close one vehicle is able to travel behind another) typically changes with speed. In highly congested slow traffic, a 1 meter separation has been recorded. This separation obstructs view of the plates on the tailgating vehicle for the purposes of imaging, and also for purposes of RFID, by overhead and side mounted and cameras and RFID readers. However, it would not obstruct the view, and hence the ability to detect/identify the plate/tag (using RFID) and also image the plate (using the camera), by an in-road or on-road RFID reader or image reader (camera). There therefore seems to be clear benefits to the placement of a sensor, which incorporates an RFID reader and preferably also an image reader (camera), on or in the road surface (as depicted in FIGS. 7-9).

Figure 13:
FIG. 13 shows a vehicle number plate which has been installed at a slightly downward facing angle to reduce the ability to read the plate from an overhead or side camera.

FIG. 13 shows a vehicle number plate which has been installed at a downward angle to reduce the ability to image/read the plate using an overhead or side-mounted camera. Basically, the angle of the plate in FIG. 13 tends to hide/obscure the plate's characters from the view of the camera. Such downward-angling of a plate may also cause difficulties, where the plate has an RFID tag mounted thereon, for the ability of an overhead or side-mounted RFID reader to read the RFID tag on the plate.

It will be appreciated that downward-angling of a number plate, as illustrated in FIG. 13, would not impede the ability to read/image the plate using a camera positioned on or in the road (like the camera in the sensor depicted in FIGS. 7-9). At this point, it might be thought that, in order to impede the ability of an on-road or in road camera to image/read the plate, the plate could alternatively be angled to face upward. This may indeed impede an on-road or in road camera's ability to image/read the plate. However, where the on/in road camera is also provided with an RFID reader (or where there is an associated on-road or in-road RFID reader), and where the number plate has an RFID tag thereon, the RFID reader should still have no difficulty in communicating with the RFID tag on the plate. This is because the short read distance helps to ensure a positive read of the RFID tag. (An upward angle may also improve readability for manual vehicle identification methods, such as by on-site visual inspection by a human).

RFID read performance can be influenced by environmental, static and dynamic influences.

Environmental influences include radio noise/interference and weather conditions which may charge the air or result in water, dirt, ice, etc, on antennas (these change the antenna tuning due to their dielectric effects, and they also absorb and scatter radio energy). Handling and catering for such environmental influences is a common consideration in most RFID fields/applications, and many techniques/strategies for doing so have been established. Environmental influences, and the way in which they can be catered for, therefore need not be discussed further here.

Figure 15:
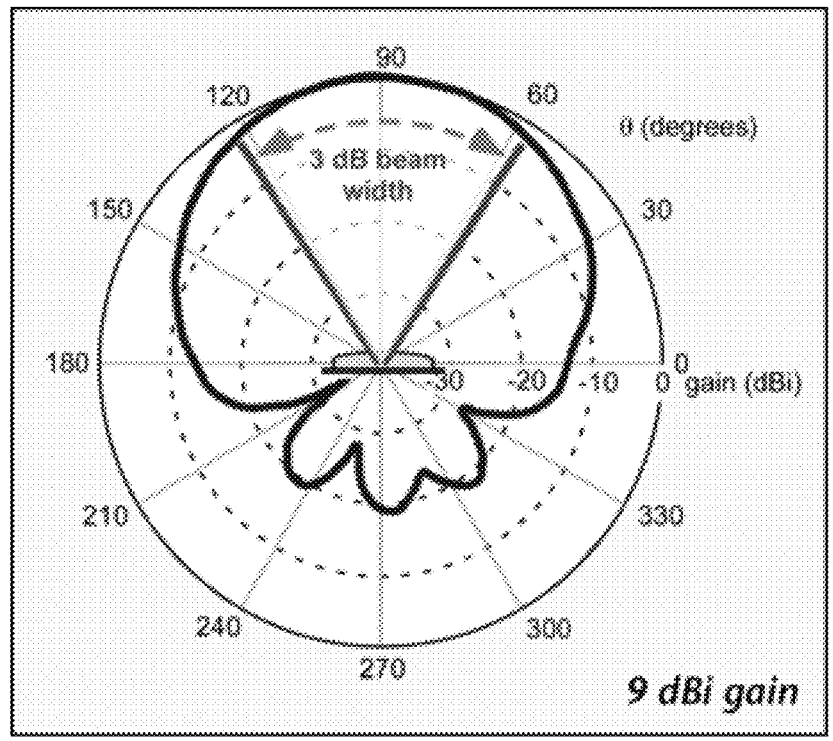
FIG. 15 is a plot of the "radiation pattern" (also referred to as the "antenna pattern" or "far-field pattern") for a directional (narrow aperture) antenna. The radiation pattern is a representation of the way the antenna's gain varies with direction.

Directional antennas with a narrow aperture have become a de facto standard for RFID use since they reduce radio noise by focusing the beam (antenna radiation) to the area of intended read. FIG. 15 illustrates the radiation pattern of a directional antenna. The radiation pattern is a representation of the way the antenna's gain varies with direction. In FIG. 15, the 3 dB beam width indicates the aperture of the antenna. Every 3 dB loss halves the antenna sensitivity and signal power. The antenna is most sensitive for a signal from a source located in this aperture. It will therefore be appreciated that unwanted signals (noise) from outside of the antenna aperture will be filtered from a signal from a tag that is in the antenna aperture. It should be noted that FIG. 15 relates to an antenna design that is a classic patch and parabolic (directional) design used in point to point communications and RFID.

Figure 16:
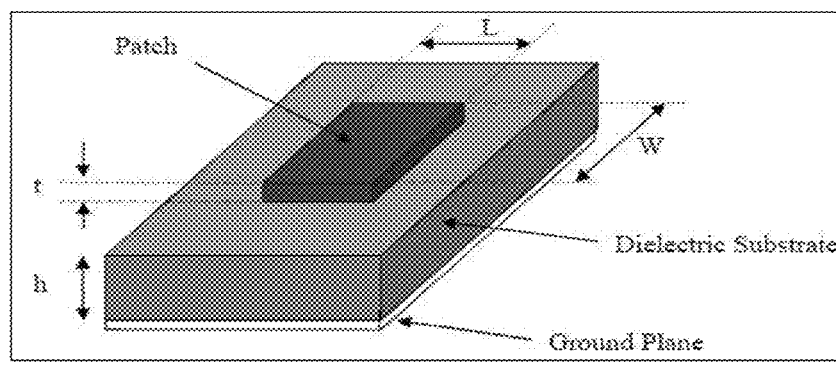
FIG. 16 is a schematic representation of a typical construction of a patch antenna.

FIG. 16 is a schematic representation of the typical construction of a patch antenna. It is important to note the construction of such a classic directional antenna in relation to the radiation pattern. The radiation pattern points away from the ground plane. The ground plane for a UHF antenna used in vehicle identification is typically more than 300 mm×300 mm. The antenna needs to be placed upright in order for the beam to look down the road, which is problematic due to the size of the structure this results in.

Figure 17:
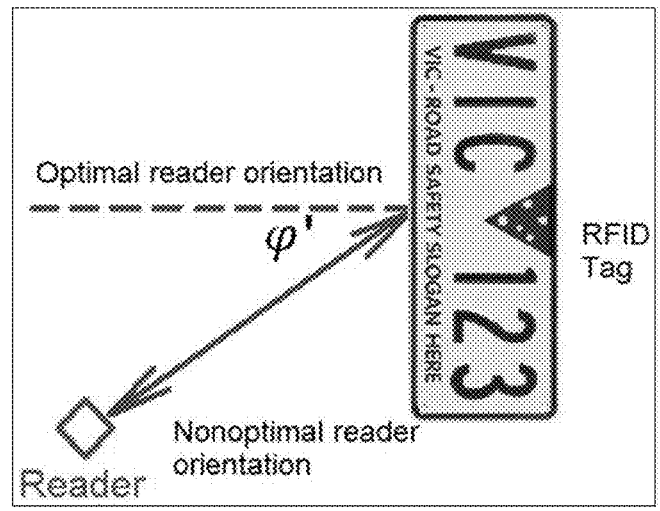
FIG. 17 illustrates a non-optimal reader and tag antenna orientation in relation to the aperture of a focused antenna.

In FIG. 17, a typical vehicle number plate is depicted, and the number plate has an RFID tag antenna thereon (the tag antenna is represented as the line which appears to underline the word "safety" on the plate). An elongate slot for accommodating an RFID tag and its antenna is also visible in the plate in FIG. 14.

FIG. 17 illustrates a non-optimal reader and tag antenna orientation in relation to the aperture of a directional antenna, as often occurs with overhead and side-mounted RFID readers. The angle of read for both the tag and the reader antennas changes as the vehicle drives past the reader. The amount of energy in the air at the non-optimal angle of the reader antenna, and the tag antenna sensitivity at the non-optimal angle, result in a compounded reduction in read performance. This problem is quite severe where the RFID tag antenna is on or in a plate (as depicted in FIG. 17) and where the RFID reader used to read the said tag is an overhead or side-mounted reader.

Figure 18:
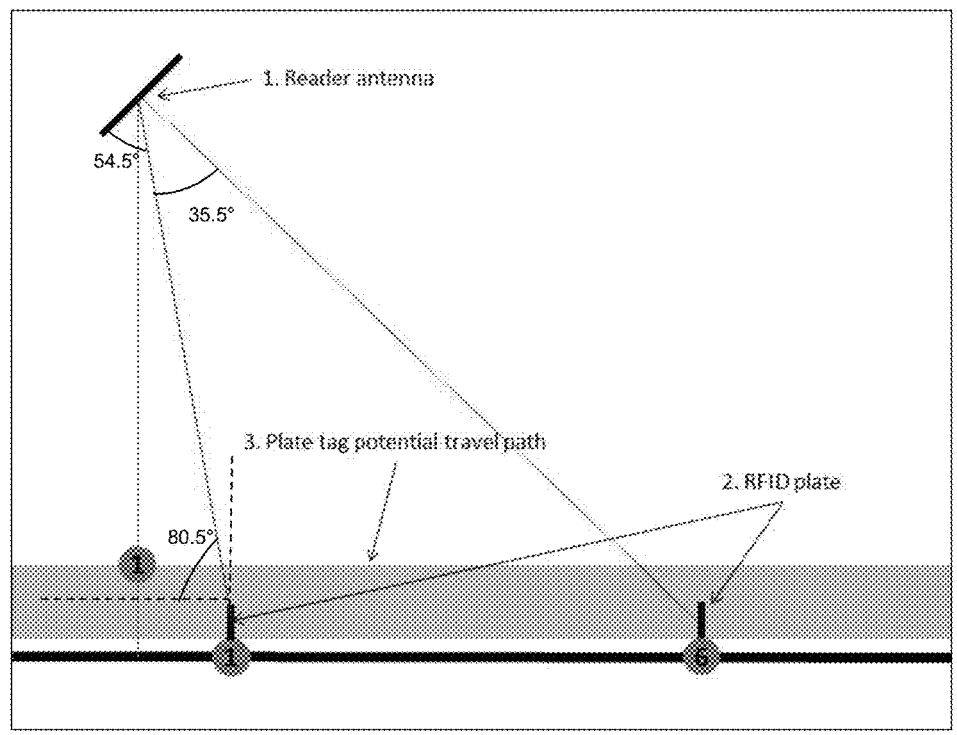
FIG. 18 illustrates how the angle of read changes as a vehicle moves in an overhead RFID plate read scenario.

By way of further example, FIG. 18 illustrates (for a vehicle number plate with an RFID tag thereon—like the one in FIG. 17) how the angle of read changes with vehicle movement in an overhead RFID plate read scenario. FIG. 18 illustrates a 6 m tall placement of the reader antenna, set at 45° to the vertical, thus pointing the maximum gain/power of the antenna towards a point that is a horizontally 6 m in front of the gantry. When a vehicle's number plate is at this point (6 m horizontally in front of the gantry), the tag antenna thereon receives this power at approximately 45° (relative to the plate's directly "face-on" direction). However, when the vehicle moves so that its plate is only 1 m in front of the gantry, the angle of the signal path between the reader and the plate is then oriented at approximately 54.5° relative to the plane of the reader (or 35.5° relative to a beam normal to the plane of the reader), and the signal path is at approximately 80.5° relative to the number plate's "face-on" direction. The result is that less than half the radio power is then available to read the tag, which means a reduction in the reliable read distance of more than two times. This example demonstrates that, where RFID tags are placed on vehicles' number plates, there may be problems associated with reading such tags using overhead RFID readers because, due to the geometry and angles involved and the limited read range associated with RFID, a vehicle's RFID tag may only be reliably readable by the RFID reader (if it is at all) within a small physical region/area in front of the overhead gantry, and depending on the speed at which the vehicle is travelling, this may or may not allow sufficient time for the RFID tag to be reliably read (it being appreciated that a certain minimum amount of time is required to perform a communication between the tag and the reader, but the amount of time that the vehicle remains in the small "read" region/area in front of the gantry decreases with increasing vehicle speed). This issue is discussed further below with reference to FIG. 20. This may be another reason why it may be preferable for an RFID reader to be placed on or in the road, rather than overhead, because this places the reader closer to the tag (on the vehicle's plate), and also there are a fewer angle-related issues, meaning that there may be a much larger region/area near the reader within which the tag can be reliably read. This may in turn help to improve read reliability, and/or achieve an increase in the maximum vehicle speed before it becomes impossible to read the vehicle's tag.

Static influences also have an impact on RFID read performance. The placement of the RFID tag (the radio device on the vehicle) is an example of a static influence. Locations on a vehicle where an RFID tag might (logically) be placed include on the inside of the windscreen, on a headlamp and on or in the number plate. Windscreen and headlamp placements display similar performance and use properties. Therefore, for the purpose of this discussion, headlamp placements will be included within (i.e. this will be considered similar to, or a variation on) windscreen placement (with similar issues).

The placement of a tag in a windscreen (or a headlamp) must take into account the glass properties and body shapes. It is also important that RFID tags, when installed in windscreens (or headlamps) are mostly installed by unskilled persons, resulting in a high inconsistency of placements. Furthermore, metal body parts of the vehicle can deform/distort/complicate the RF radiation pattern (as discussed further below). Also, glass, due to both its composition and thickness, displays a wide dielectric spread and may even act as a radio shield as a result of tinting and/or hardening. Tag placement therefore has both a random and predictable read performance impacts.

Figure 19:
FIG. 19 shows a vehicle number plate mounted within a cavity to protect it from damage.

The placement of a tag on or in a metal plate (like a number plate) may help to largely avoid the radio influences of the vehicle. The metal plate functions as a ground plane which shields the beam from the vehicle structure. This is especially true where a plate is mounted in such a way that a clear line of sight, as required by most legislation (for visibility reasons), is maintained for the plate (at the front and the back). FIG. 19 shows a plate mounted within a cavity to protect it from damage. This mounting does not obstruct the reading of the plate by a human, but an overhead camera and RFID reader may have problems reading the plate.

In normal conditions, considering radio properties, interference and data loss retries, UHF RFID identification requires approximately 80 ms to reliably exchange 512 bits of identification data. 512 bits of data is considered to be enough data to identify a vehicle and perform a rudimentary offline verification of that identity. A vehicle travelling at 36 km/h will travel 0.8 m in 80 ms, and a vehicle travelling at 180 km/h it will travel 4 m.

Reports from current RFID installations suggest an effective vehicle identification range is between 6 m and 8 m. This limits the application of roadside RFID reader placements for free flow, in traffic, vehicle identification.

Overhead readers on gantries are today the de facto RFID reader deployment standard for free-flow in-traffic vehicle identification. The typical minimum road clearance height for a gantry is 6 m.

Figure 20:
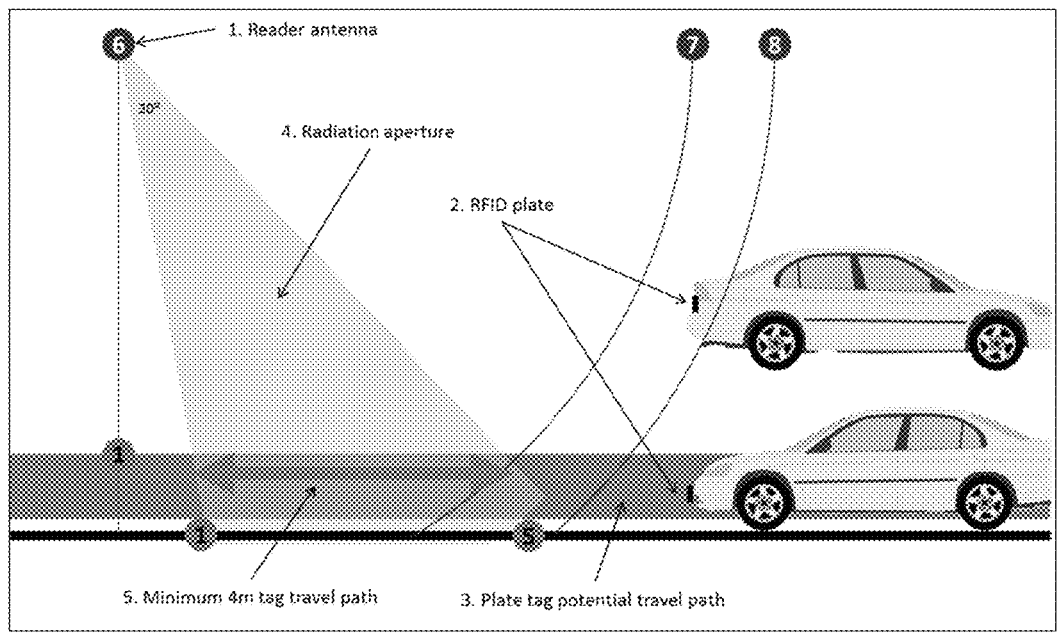
FIG. 20 illustrates the travel path of a vehicle's front and rear plate within an overhead RFID reader read-zone.

FIG. 20 illustrates the travel path of a front and rear plate 20-2 within an overhead RFID reader's radiation aperture 20-4. In this scenario the plates have an RFID tag thereon. The reader antenna 20-1 is placed 6 m above the road. Considering the tag/plate travel path 20-3 and the RFID technology read performance limitations, a minimum read range (at non-optimal plate/tag/antenna angles) of 7.5 m is required to read the plate tag reliably. This is on the edge of current reliable RFID read range for this application, as indicated in FIG. 20 by the 7 m and 8 m arcs and the minimum tag travel path 20-5.

Figure 21:
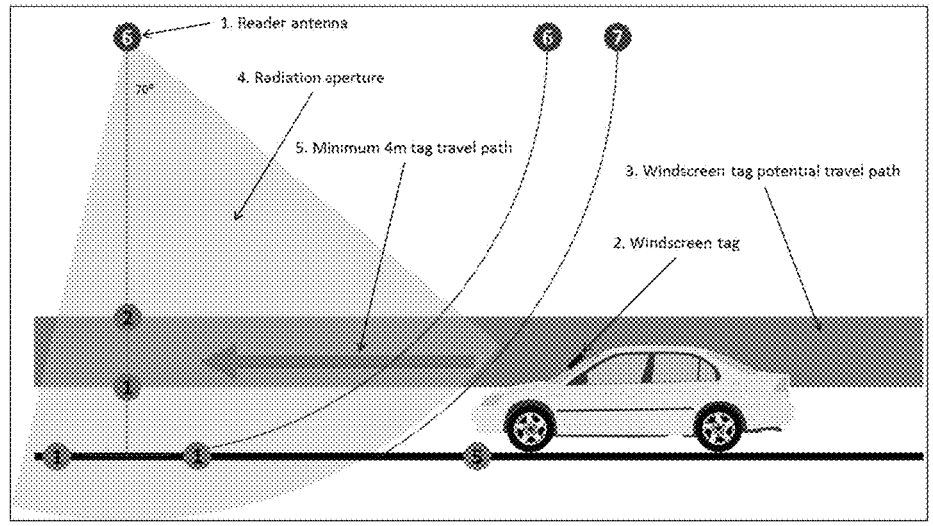
FIG. 21 illustrates the travel path of a windscreen-mounted tag on a vehicle within an overhead RFID reader read-zone.

FIG. 21 illustrates the travel path of a windscreen-mounted tag 21-2 within an overhead RFID reader's radiation aperture 21-4. The reader antenna 21-1 is placed 6 m above the road. It must be noted that the vehicle windscreen orientation may range from vertical (as found on trucks and buses) to almost horizontal (as found on vehicles like sports cars). Considering the range of possible windscreen angles, the tag travel path 21-3 and the RFID technology read performance limitations, a minimum read range (at non-optimal tag/antenna angles) of 6.5 m is required to read the windscreen-mounted reliably. Also, considering that buses and trucks are likely to travel at lower speeds than passenger vehicles, and normally the tag in their windscreens is placed higher, this reduces the effective read range requirement to below 6 m. This is within the current reliable RFID read range for this application, as indicated in FIG. 21 by the 6 m and 7 m arcs and the minimum tag travel path 21-5. However, the windscreen as a location for RFID tag placement is considered unsuitable, for reasons discussed below, as is the use of overhead readers/gantries.

Static measurements support the theoretically superior read performance achieved by windscreen mounting RFID tags where overhead RFID readers are used, as compared to (say) the case of plate-mounted RFID tags with overhead RFID readers. This is perhaps not surprising as windscreen mounting places the RFID tag closer to the reader. Static measurements indicate a close to 100% read performance where static influences and expenses are negated. However, read performance for existing operations (practical real world implementations) are less than 98%. This figure seems to drop as vehicle speed and traffic density increase.

It is thought that (as mentioned above) there are inherent flaws associated with the use of windscreen-mounted (or likewise headlamp-mounted) RFID tags and with overhead RFID readers for the purpose of vehicle identification, especially in open-road free-flow applications. One reason for this is discussed below with reference to FIG. 22.

Figure 22:
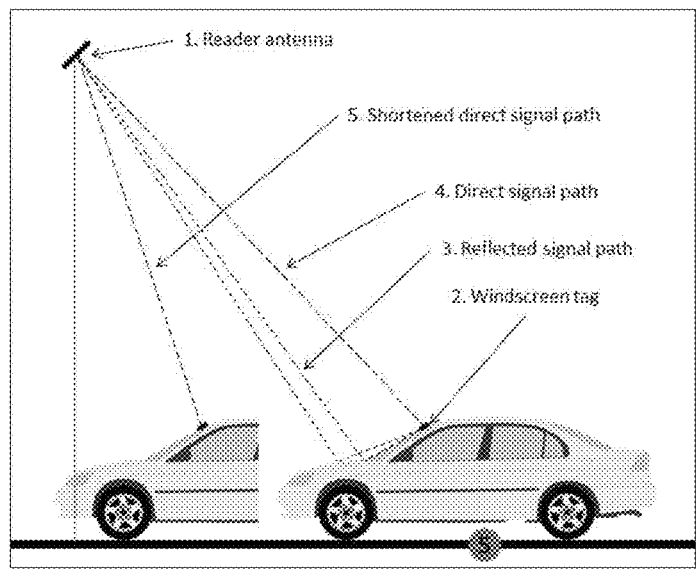
FIG. 22 illustrates factors that contribute to create non-linear variation of the signal between an overhead antenna and a windscreen-mounted RFID tag.

FIG. 22 illustrates certain factors that contribute to create non-linear variation of the signal between an overhead RFID reader antenna and a windscreen-mounted RFID tag, including as a result of movement of the vehicle. More specifically, FIG. 22 illustrates the direct signal path 22-4 between the overhead RFID reader antenna 22-1 and the windscreen-mounted RFID tag 22-2, together with a number of factors which contribute to create nonlinearity associated with the direct signal path. Firstly, movement of the vehicle towards the overhead gantry on which the reader 22-1 is mounted causes a shortening in the length of the direct signal path 22-4, as indicated by 22-5. The shortening of the direct signal path, in fact, changes as a tangent (Tan) function of the angle of the signal path, and this results in a squared (non-linear) tangent shift, which is in relation to the speed of the vehicle and of the reflected signal carrier wave. This effect might perhaps be handled, at least to some extent, by using short data packet lengths allowing rapid signal timing synchronisation. This may be effective when the signal received is predictive in behaviour and of singular source. However, in addition to the shortening of the signal path and the effects this causes (just discussed), the metal surfaces and edges of the vehicle body act as near-perfect reflectors causing a multitude of other near-perfect (but slightly out of phase) reflected signal paths 22-3. The multiple reflected signal paths 22-3 (which are inherently unpredictable due to varying vehicle windscreen and body configurations, and also bearing in mind that each of these reflected paths 22-3 is also subject to signal path shortening and the issues associated therewith) combine to result in an overall/net signal that incorporates the multiple variable signals, each having an exponential (non-linear) tangent shift. This results in a signal with unpredictable signal noise, but where the noise is similar in nature to the real signal (which is worse, and more difficult to filter out, than unrelated background noise or the like). The occurrence of these highly damaging permutations on the signal is dependent on tag-reader orientation, tag placement, vehicle construction, vehicle speed and other reflectors (vehicles) in close vicinity. It should be clear that the alleviation of this non-linear multi-path problem is very difficult to achieve, especially when the vehicle is moving at high speed.

Sensors which are positioned on or in the road have previously been proposed and used, however previously their use has been avoided due to issues associated with, for example, difficulties in achieving safe access for personnel for maintenance of the on-road or in-road sensors, the potential for damage to the integrity of the road surface due to the placement of the sensor in the road, the undesirable necessity for (at least partial) road closures for installation, repair or maintenance of the sensors, etc. In/on-road sensors also need to deal with road vibrations, wheel impact shocks and on road fluids, dirt, contaminants, etc. Nevertheless, it is thought that an appropriate structure for such an on-road or in-road sensor, which alleviates or at least reduces these problems to some extent, is feasible. For instance, the sensor size, format, power provision and communications may be selected and combined in a manner to minimise the impact on the road and the time to install the device. At the same time the design may ensure durability and ease of maintenance of the device on/in the road.

For reasons that have previously been discussed, an in/on-road location is a much more preferable placement location for an RFID reader, especially if the tag is on or part of a vehicle number plate (which is also thought to be highly preferable). For one thing, where an in/on-road RFID reader is used and RFID tags are located on vehicle number plates, the multi-path problem (as discussed above with reference to FIG. 22) may be largely alleviated since the only real reflectors which might reflect a signal between the in/on-road reader and an on-plate tag are the road itself and other vehicles in an adjacent lane. The road is a weak reflector which tends to scatter the signal (rather than produce much more problematic near-perfect but slightly out of phase reflections). And adjacent vehicle multi-path reflections typically display a first order tangent behaviour which can be filtered relatively easily.

Figure 23:
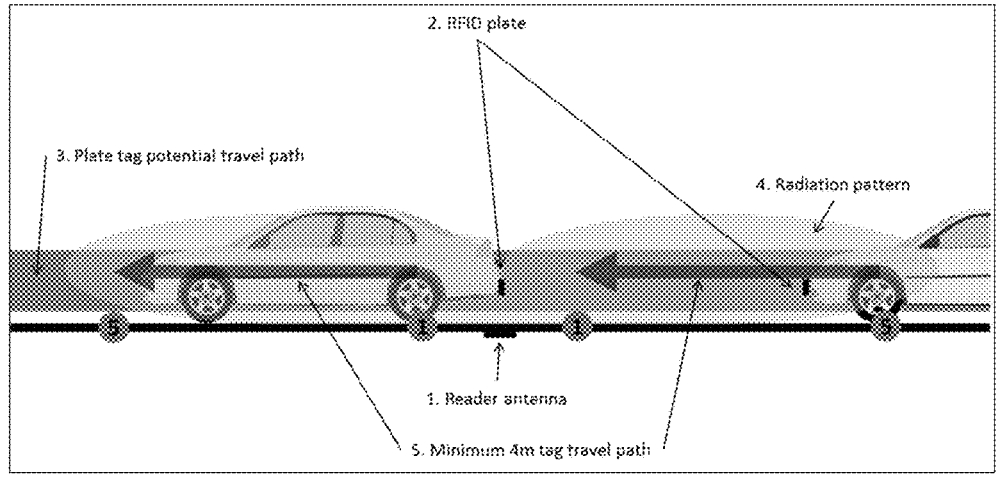
FIG. 23 illustrates the required (or at least a desirable) RFID radiation pattern for a reader antenna placed in/on the road.

FIG. 23 illustrates the required (or at least a desirable) RFID radiation pattern 23-4 for a reader antenna 23-1 which is placed in/on the road. It will be noted that the radiation pattern is quite low and wide/flat relative to vehicle height and travel direction (contrast between the radiation patterns on the left-hand side and right hand side respectively in FIG. 24). The RFID tag 23-2 is placed in or on the vehicle's front and/or rear number plate resulting in a potential travel path 23-3 which is typically the space between about 200 mm and about 1200 mm above the road surface (i.e. whatever the type of vehicle, e.g. car, truck, bus, motorcycle, etc, its number plate, with the RFID tag thereon, will typically pass through this region 23-3 which is 200-1200 mm above the ground as the vehicle passes the reader). Those skilled in the art will appreciate, from FIG. 23, how an in/on-road placement may alleviate or at least reduce read issues associated with short following distances, tailgating, etc. In FIG. 23, the illustrated gap between the vehicles is 4 m.

Whilst an in/on-road location is considered to be a more preferable placement location for an RFID reader, especially if the tag is on or part of a vehicle number plate (which is also thought to be highly preferable), nevertheless in/on-road RFID readers do also have certain radio problems.

Figure 24:
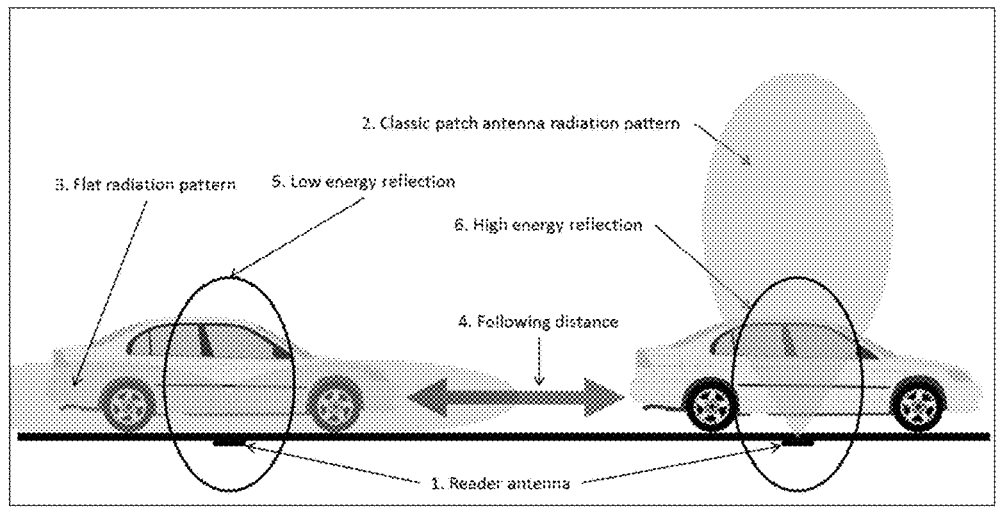
FIG. 24 illustrates the impact of a short following distance between a classic patch antenna radiation pattern and a flat radiation pattern as emitted from an in/on-road reader.

FIG. 24 illustrates a classic patch antenna radiation pattern 24-2, and a wide flat radiation pattern 24-3, respectively, as emitted from an in/on-road reader 24-1. The metal surface under a vehicle is a reflector, and it is close to the reader antenna, and this can result in a blinding energy reflection which, in the case of a classic patch antenna, will be very high (as indicated by the amount of depicted energy within the region 24-6 in FIG. 24). A wide flat radiation pattern may help to reduce this reflected energy substantially (as indicated by the amount of depicted energy within the equivalent region 24-5 in FIG. 24). This is one reason why a wide flat radiation pattern, and an antenna that can achieve this, may be preferable.

Figure 25:
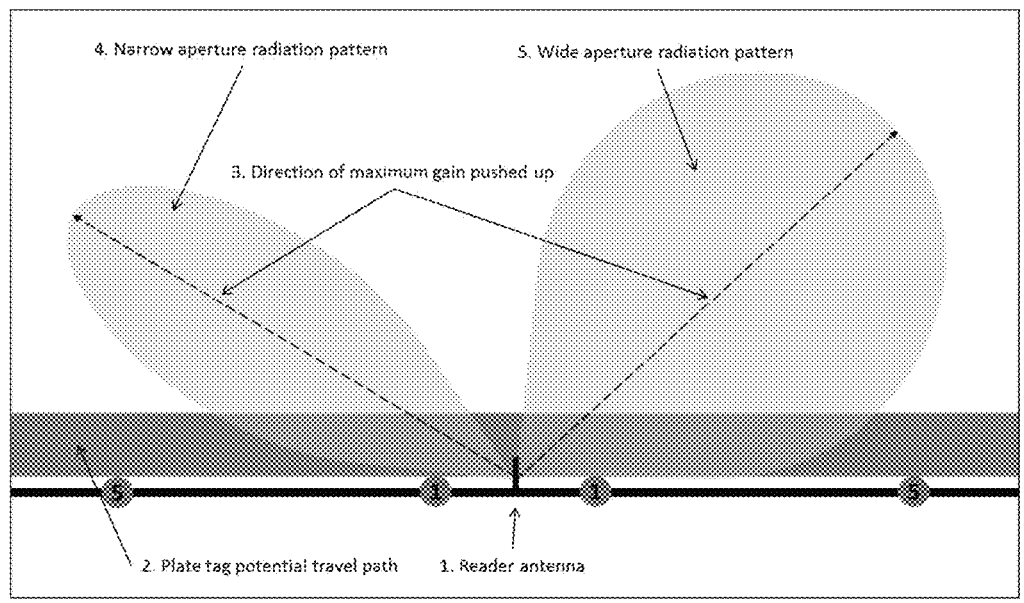
FIG. 25 illustrates the radiation pattern being pushed upwards, because of a conductive ground effect.

A flat radiation pattern can be achieved by turning a classic directional antenna (like the one illustrated in FIG. 15) on its side. However, this would result in a structure on the road which might be (typically) approximately 300 mm tall and wide. Such a structure is obviously not feasible for use on the road as it would obstruct traffic and would likely be destroyed by the first vehicle to collide with it (not to mention the damage caused to the vehicle, potential accident injuries, etc). Lower structures may be achieved by using, for example, slotted antenna designs. These designs are, however, also thought to be unsuitable because of the ground effect which changes as the ground plane becomes more or less conductive due to construction materials and moisture. A typical impact of a conducting ground effect is to push the direction of maximum gain upwards. FIG. 25 illustrates a radiation pattern pushed upwards, because of a conducting ground effect. This effect is present where, for example, metal reinforcing is present in the road and/or conductive fluids are on or in the road surface. In FIG. 25, the reader antenna 25-1 is placed on the road resulting in an upright structure. The path of maximum gain 25-3 is pushed up, in this case by 30 degrees, although typical values are more than 30 degrees. A narrow aperture radiation pattern 25-4 does not provide enough energy in the plate tag potential travel path 25-2. The aperture may be widened 25-5, but then upwards energy becomes a problem (as discussed above with reference to FIG. 24).

Figure 26:
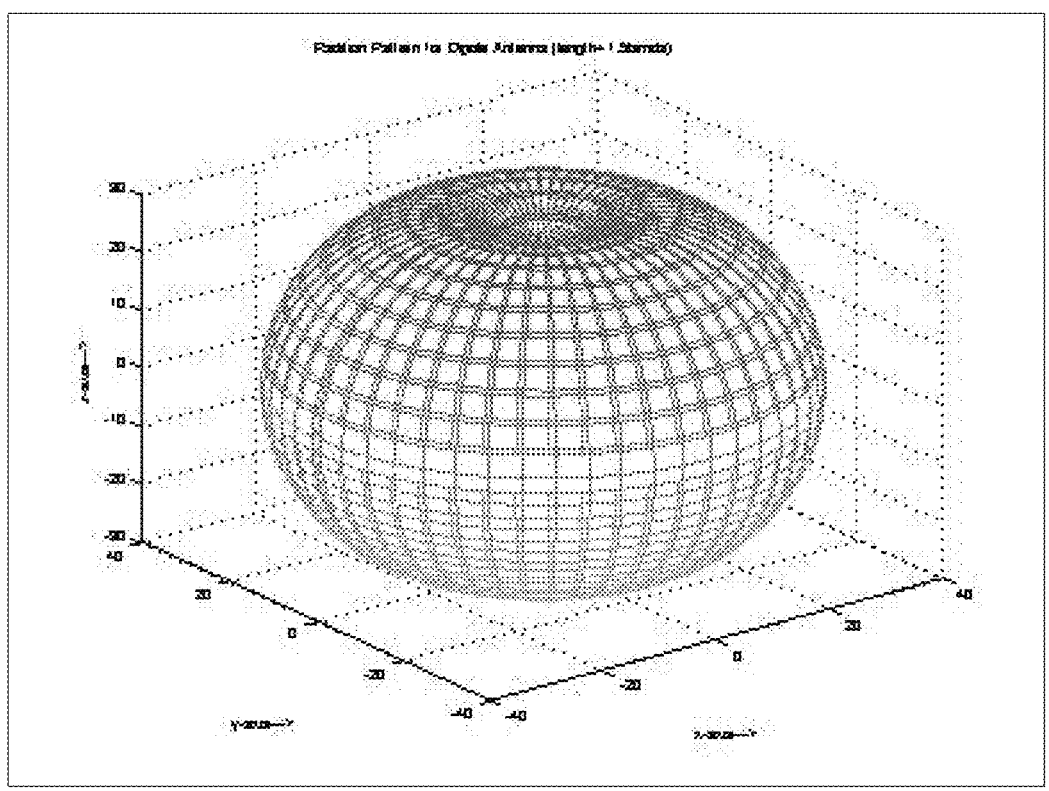
FIG. 26 illustrates a typical upright dipole antenna radiation pattern in free space.

Another type of antenna is a dipole antenna. Dipole antennas generally, and their properties, are well understood and therefore need not be introduced or discussed in detail here. FIG. 26 illustrates the radiation pattern of a typical upright dipole antenna in free space. A standard dipole antenna (which is typically a double-ended antenna consisting of two straight conducting elements oriented end to end on the same axis) may, however, not be ideally suited for on/in road use in the present context, especially given the range of frequencies typically used for this, because if such a dipole antenna were to be oriented vertically it may extend too high above the road surface to be suitable for on/in road use.

Figure 27:
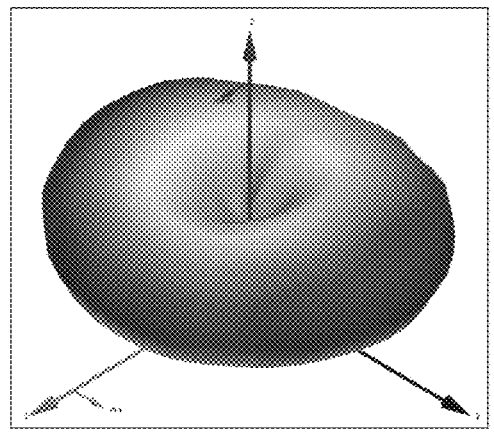
FIG. 27 shows the calculated radiation pattern of an antenna which is configured to provide a radiation pattern of generally similar shape to the radiation pattern of an upright dipole antenna, when the said antenna is placed on or in the road with it's central tap point level with the road surface.

FIG. 27 shows the calculated radiation pattern of an antenna which is configured to provide a radiation pattern of generally similar shape to the radiation pattern of an upright dipole antenna. Such an antenna may be referred to (note: this is for convenience of reference only) as an "adapted dipole" antenna. The term "adapted dipole" antenna may therefore be said to refer to an antenna which is adapted/configured to provide a radiation pattern of generally similar shape to the radiation pattern of an upright dipole antenna (or perhaps a similar but somewhat wider flatter shape), even though the actual structure and configuration of the antenna itself may differ (possibly considerably or totally) from that of a traditional dipole antenna. Referring again to FIG. 27, this actually shows the radiation pattern of an adapted dipole antenna (see meaning above) which is placed on or in the road with it's central tap/feedline point level with the road surface. This is a radiation pattern of an antenna that may be suitable (possibly even ideal) for reading RFID tags on vehicle number plates. Note that this radiation pattern is quite wide and flat, and located on or just above the road surface. More specifically, the antenna radiation pattern in FIG. 27 has a wide and low (flattish) generally toroidal shape. Or, to put this another way, the shape of the antenna radiation pattern in FIG. 27 is a wide low elliptic torus (similar to the shape of a doughnut that has been dropped on the ground and squashed/flattened somewhat). Details of antenna design adaptation/reconfiguration for the purpose of, for example, providing a desired antenna radiation pattern (and how this can be done) will be familiar to those skilled in this area, and therefore need not be discussed in detail. Using these techniques, it may be preferable to provide an adapted dipole antenna configured for positioning on/in the road and which can provide a desired radiation pattern. An adapted dipole antenna configured for positioning on/in the road and which provides a radiation pattern the same shape as (or similar to) that shown in FIG. 27 (or to 23-4, or 24-3, etc) is one example of such an antenna that may be suitable or ideal.

An adapted dipole antenna, when installed in the above manner, would be directionally independent in the plane of the surface of the road. Thus, RFID tags will read equally well when facing the antenna from all directions. This may be beneficial, say, at cross roads (where vehicles may pass the antenna from a variety of directions) and/or when rapidly deploying the antennas as no alignment of the antenna is required, only appropriate spacing where multiple antennae/sensors are used.

A traditional dipole antenna emits a linear polarised signal which requires the tag (i.e. the tag on a vehicle number plate) to "reflect" a signal (or produce a modulated reply/response signal) with the same polarisation. RFID has previously been developed (e.g. for use in logistics) where polarisation is not predictive or fixed in operations. Reflections also change the direction of polarisation. There has therefore previously been a preference, in the field of RFID, to use circular polarised antennas. However, a vehicle number plate, including an RFID tag (and it's antenna) thereon, is highly predictable in terms of its mounting and design. Previous proposals have considered an RFID vehicle number plate utilising a slotted antenna which is vertically polarised. This may be an appropriate match for an adapted dipole antenna in the road. Similarly, previous proposals have specified [close to] linear polarised on-metal RFID tag designs which can be mounted upright on a vehicle number plate.

Figure 28:
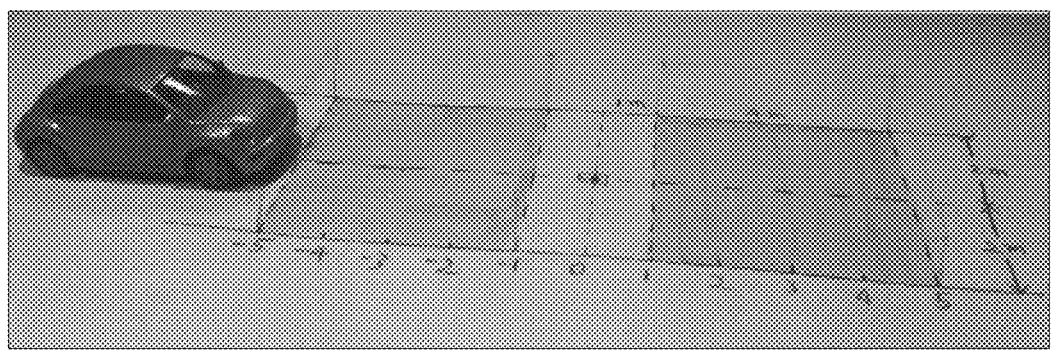
FIG. 28 illustrates the desired read-zone for a RFID enabled vehicle number plate.

FIG. 28 illustrates the read-zone for a vehicle equipped with a RFID enabled number plate. The lane is 4 m wide with the read-zone starting at 5 m before the reader antenna and ending at 5 m beyond the reader antenna (the reader in this instance is located in the centre of the road lane at the marked 0 m point). The space from 1 m before to 1 m beyond the reader antenna is excluded in an attempt to reduce the blinding effect (discussed above with reference to FIG. 24) and also because of angled-read problems that may arise in this region especially for vehicles (and the plates thereof) which are moving near the side of the lane (rather than down the centre of the lane directly in line with the sensor).

Figure 29:
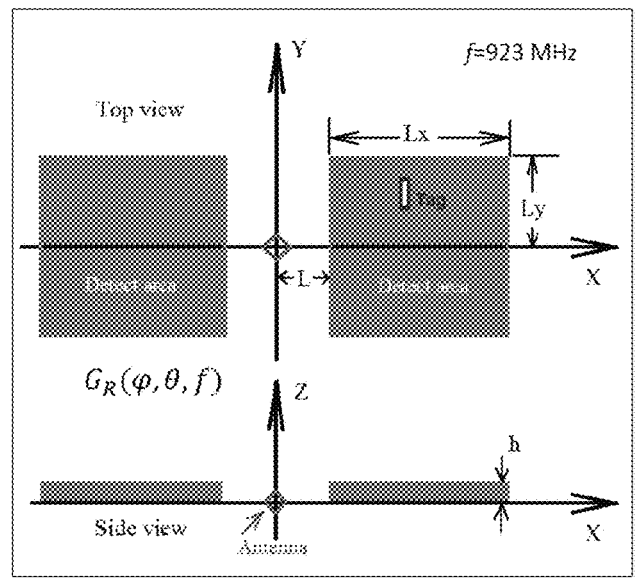
FIG. 29 schematically illustrates the plate tag orientation within the read-zone of an in/on-road RFID reader or camera.

FIG. 29 is, in effect, a schematic representation of what is depicted pictorially in FIG. 28. Thus, FIG. 29 shows the plate tag orientation within the read-zone of an in/on-road RFID reader or camera. In FIG. 29, Lx is in both cases limited because of vehicle following distances. The typical values for the parameters in FIG. 29 are: L=1 m, Lx=4 m, Ly=2 m and 200 mm≤h≤1200 mm. The system read performance is a function of the read angle of the plate tag and the angle of read of the reader antenna.

Figure 30:
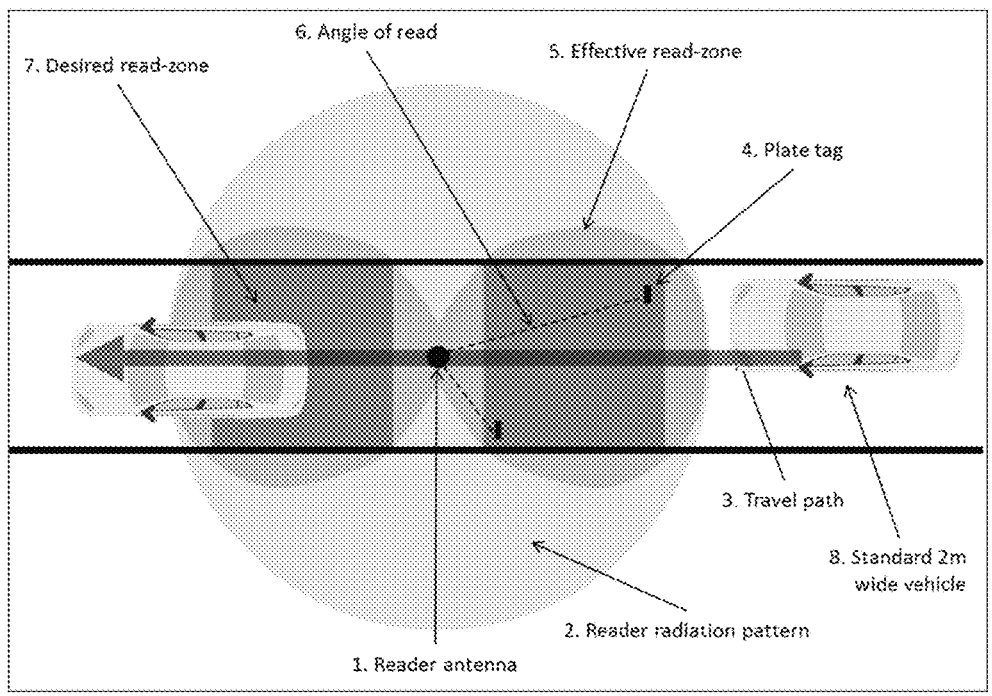
FIG. 30 illustrates the effective read-zone for a RFID tag on a vehicle number plate when read using an in-road or on-road antenna of a kind having a radiation pattern of the general shape shown in FIG. 27.

FIG. 30 illustrates the effective read-zone 30-5 for a RFID tag 30-4 on a vehicle number plate, when using an in/on-road RFID reader with an adapted dipole antenna 30-1. The required read-zone 30-7, based on the travel path 30-3 of the vehicle, covers the typical maximum lane width of 4 m and the required 4 m in-beam travel path. The reader's (wide and flat) "doughnut" shaped radiation pattern is indicated in FIG. 30 by the circle labelled 30-2, however it will be understood that this radiation pattern 30-2 (which appears as a circle in FIG. 30) is actually a doughnut/toroid shaped beam like the one shown in FIG. 27 (or 23-4, or 24-3, etc). In any case, the reader's doughnut shaped radiation pattern 30-2, with a face-on read range of approximately 6 m, combined with the effect of the angle of read 30-6 on the plate tag, results in the illustrated effective read-zone 30-5. As shown in FIG. 30, the effective read zone 30-5 is roughly "FIG. 8"-shaped, with the centre of the FIG. 8 located at the position of the reader 30-1 and the two lobes of the "FIG. 8" on either side thereof in the direction of the road. (It should of course be recalled that the adapted dipole antenna 30-1 is non-directional and therefore the orientation of the "FIG. 8" shaped effective read zone 30-5—i.e. in line with the vehicle's direction of travel—arises due to the geometry of the required read zones 30-7, and the convergence of the FIG. 8 lobes near the reader arises due to angle of read issues. These factors concerning the orientation of the "FIG. 8" shaped effective read zone 30-5 are therefore not a result of the design/configuration of the antenna 30-1 itself).

Figure 31:
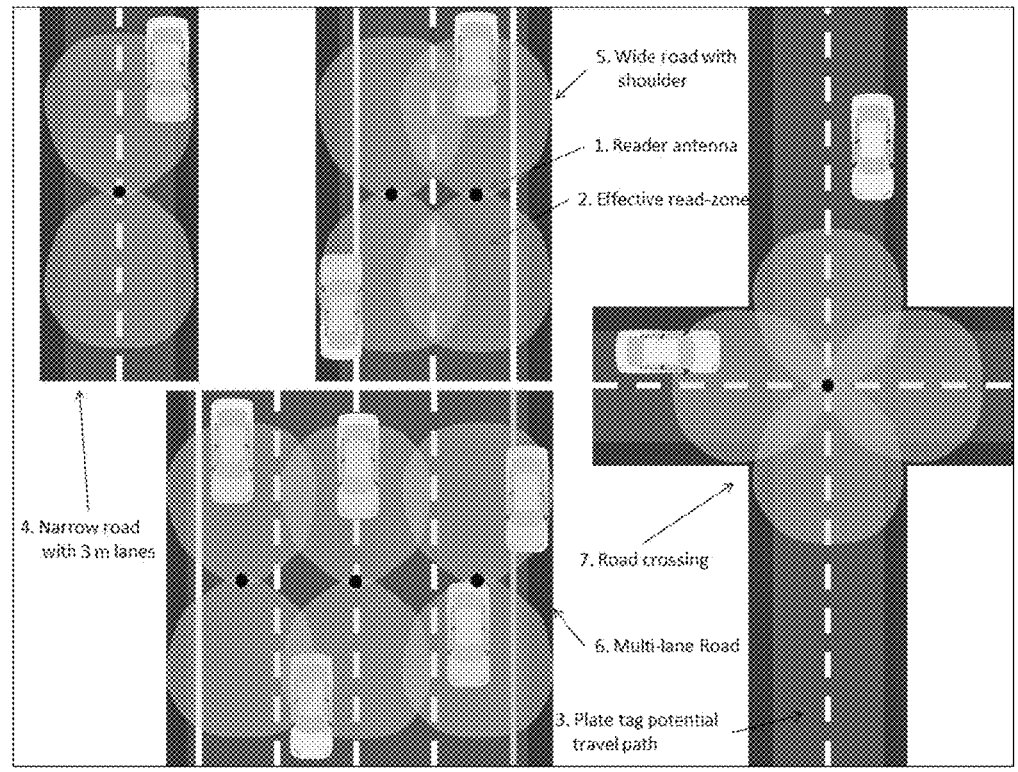
FIG. 31 illustrates example uses of single or multiple RFID readers, with the resulting effective read-zone, in different read scenarios.

FIG. 31 illustrates example uses of single or multiple RFID readers, each utilizing an adapted dipole reader antenna 31-1, or multiple thereof, with the resulting effective read-zone 31-2, in different read scenarios. The potential travel path of a plate tag 31-3 is indicated, based on where a vehicle may physically drive, on each different type of road. All road lanes in these examples are 3 m wide, which is average for many road lanes. A bi-directional (single carriageway) narrow road 31-4 that is approximately 6 m wide can be covered with a single reader which will read vehicles in both directions (this is the example given in the top left of FIG. 31). A road with a shoulder, or a wide shoulder, 31-5 (the presence of the shoulder increases the width of the area in which a vehicle can travel) may however often require two readers (as illustrated in the top-middle example in FIG. 31). A four lane single direction road with shoulders 31-6 may require three readers (as illustrated in the lower left example in FIG. 31). A road crossing of two narrow roads 31-7 could potentially require only one reader, although a crossing of a narrow road with a road having wider shoulders may require two readers (which is why the latter is illustrated in the example on the right-hand side in FIG. 31).

Figure 32:
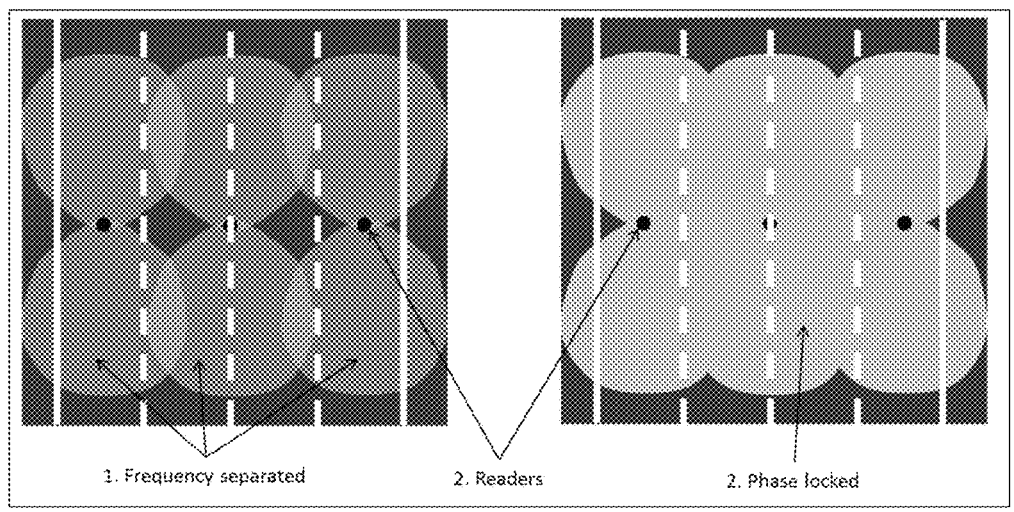
FIG. 32 illustrates an arrangement of multiple readers across a road in independent and phase locked (respectively) scenarios.

FIG. 32 illustrates, on the left-hand side, an arrangement of multiple (in this case three) readers arranged across a multi-lane road. In the example on the left in FIG. 32, the respective beams of each of the individual readers are using different radio frequencies 32-1, and therefore each performs vehicle detection/identification etc independently of the others. In contrast, on the right-hand side in FIG. 32, an example is illustrated where the multiple readers communicate with one another using radio and data methods to "phase lock" the set of readers, in a line, to form (in effect) a single beam, as if the said single beam were being emitted from a multi array antenna. The RF gaps may tend to be less in the latter example, though phase locking the respective readers may be more difficult to achieve than simply having separate, independently-operating readers.

Figure 33:
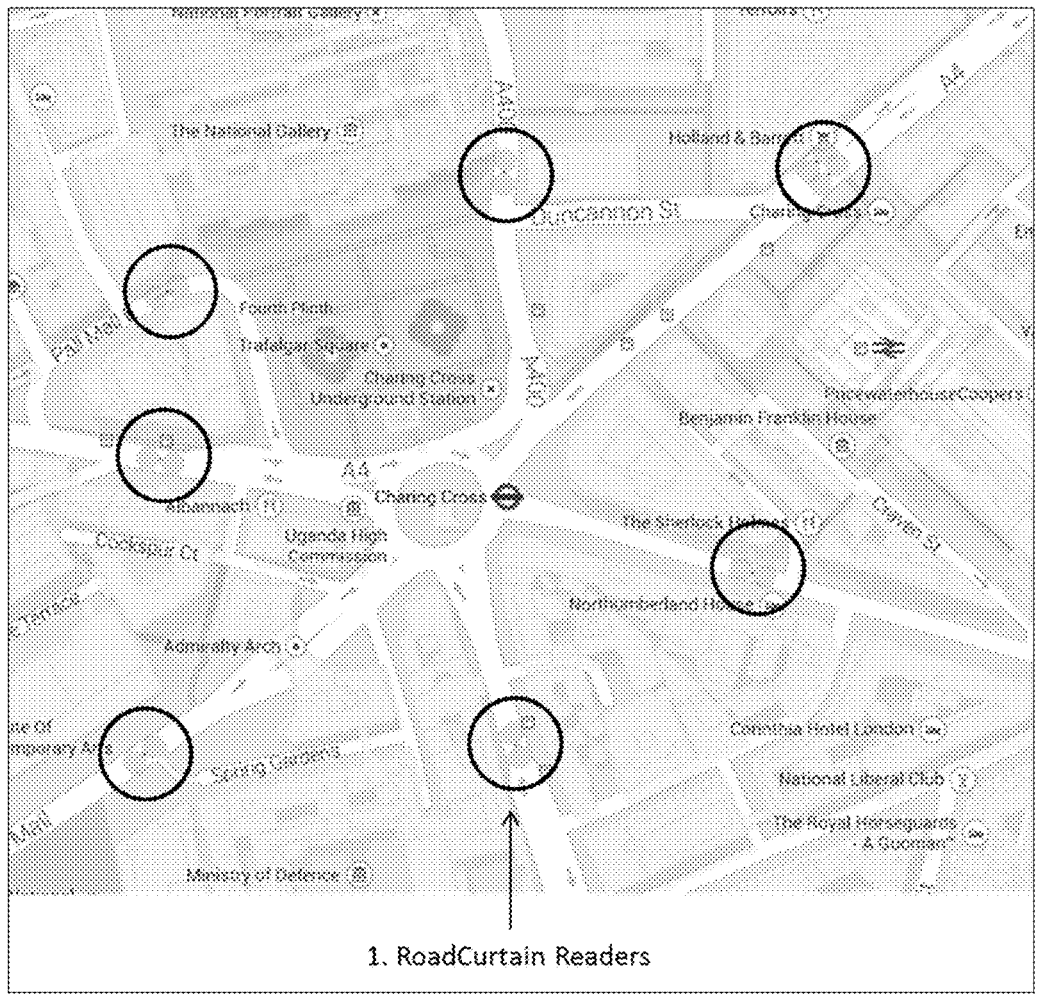
FIG. 33 illustrates the use of several single (and one multiple) on-road RFID readers in creating a vehicle cordon around a point of interest.

FIG. 33 is intended to represent the use of multiple sensors (each having an on-road adapted dipole reader antenna 33-1) in creating a vehicle cordon around a point of interest. In this example, the deployment may be a rapid deployment after an incident or a planned cordon for vehicle access control for an event. This may utilise sensors which are each small, transportable units that can be easily transported and temporarily placed at desired locations on one or more roads.

Placing a device in a road (as opposed to on the road) may have several associated challenges. For instance, the size of the device must be such as to maintain (and not undermine) the integrity of the road, specifically the road base. The device must also be able to withstand wheel impact and vibrations, of which the severity is linked (at least partially) to the size of the device. Cables to the device (e.g. to supply power to the device and/or to communicate with the device) may also require lines/trenches to be cut in the road so that the cables can be laid therein. These cables may also be subject to electric noise and power spikes. The time to install and/or maintain a device, or the associated cables, etc, in an existing road may therefore pose a cost and traffic challenge. There are also challenges associated with placing a device on the road (as opposed in the road). For instance, a device placed on a road must be low enough for vehicles to drive over it safely, including where the vehicle's wheels roll directly over the top of the device. Cables to the device may also be a problem as these often may not be buried (i.e. they may be on the ground/road surface) and vehicles may drive over them, and it may also take time to deploy such cables. There may also be difficulties associated with maintaining the device in the intended position on the road. Nevertheless, it is thought that these challenges associated with in-road and on-road placements may not be insurmountable.

With the foregoing in view, it is envisaged that embodiments of the invention may operate using or together with one or a combination of the following (and those skilled in this area will readily appreciate the associated capabilities and benefits of doing so):

RFID technology to read RFID tags that are located on or in vehicle number plates using an on-road or in-road adapted dipole reader antenna;

traffic cameras to observe vehicle behaviour and/or to track vehicles as image objects;

on-road or in-road fixed-focus still imaging (using visible and/or invisible light) for automatic number plate recognition (ANPR), other symbology (e.g. barcodes) recognition, vehicle image fingerprinting or other image-based identification, etc. (Note that the use of fixed-focused still imaging cameras or the like may not only allow the use of ANPR and/or other image-based recognition/read techniques, but it may also help to significantly reduce technological complexity and consequently deployment cost. For instance, by providing cameras operable to obtain still images at specific fixed distances only (e.g. when a vehicle is 4 m from the camera and 2 m from the camera, as illustrated in FIGS. 10 and 11, and/or images of the rear of the vehicle after the vehicle has travelled 2 m and 4 m beyond the camera), the cameras may enable ANPR etc without the need for sophisticated image focusing functionality. Hence, the cost of the camera (or other imaging device) used may be substantially reduced);

laser and radar for vehicle detection, vehicle position detection and vehicle speed detection. (In relation to radar, it is envisaged that radar information (e.g. a radar cross section) may also be obtained using variable/differential radar techniques which are based on (and use) the fact that a vehicle moves say a fixed/known distance (e.g. from 5 m to 2 m in front of the sensor, and from 2 m to 5 m after the sensor) to obtain the radar information);

radio for data communication; and

RFID and radio to synchronise multi-reader deployments.

The invention, at least in some embodiments, may therefore be operable to help to ensure that a vehicle number plate indeed lawfully represents the observed vehicle it is attached to. Embodiments of the invention may also combine technologies in a manner whereby accurate detection of a vehicle identity and its behaviour, and the verification of the identity of such a vehicle, can be achieved to allow for immediate intervention. This may preferably be done with sufficient frequency to help promote and maintain trust in vehicle number plates (as an indication of vehicle identity), and it is thought that the invention (in some embodiments)

might also be used to help provide accurate information for road planning and traffic management.

In view of this, it is thought to be preferable if devices, apparatus, systems, etc, in accordance with (at least some embodiments of) the invention could be suitable for rapid/quick deployment, with comparatively low-cost (both in terms of initial production and deployment/installation, and subsequent maintenance).

Embodiments of the present invention may help to improve vehicle identification/verification performance, and vehicle behaviour detection, by eliminating weaknesses (some of which are discussed above) associated with technologies and systems that have previously been used for this. Emphasis may be placed on detecting and isolating vehicles which cannot be identified, or which behave out of norm of current traffic and road rules, on a monitored stretch of road allowing for police to act upon this detection.

A possible specific system implementation, and the devices used therein, will now be discussed.

Figure 34:
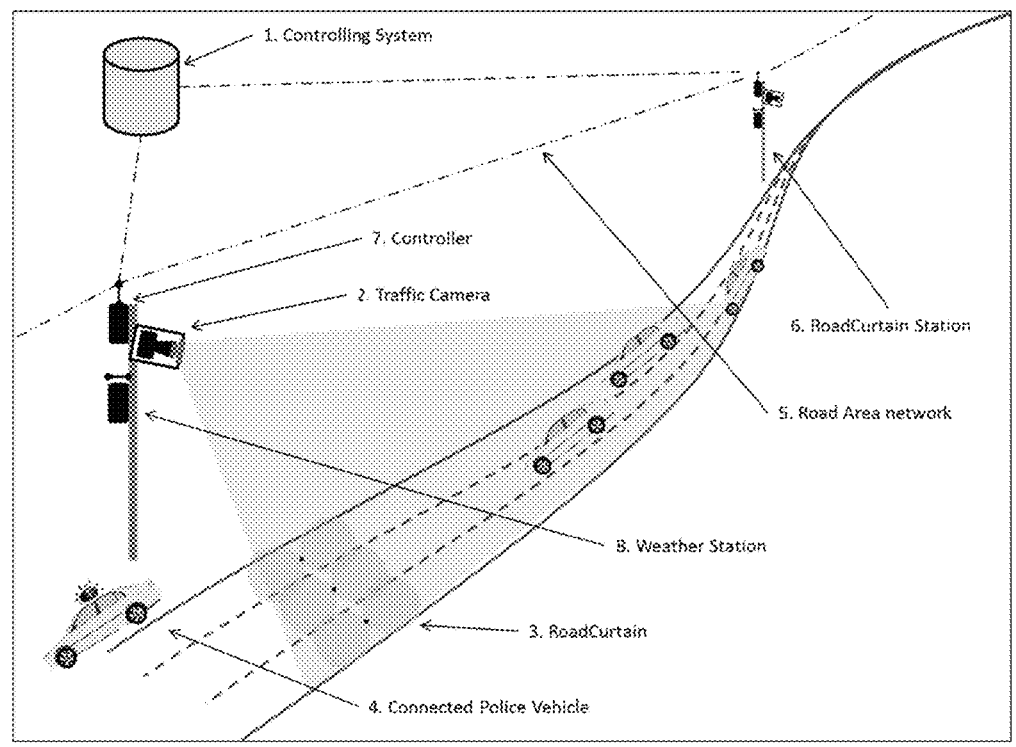
FIG. 34 is a schematic illustration of one particular (possible) system implementation.

FIG. 34 illustrates a typical scenario in which the said system is used. For the purpose of explaining this system implementation, an installation of a set of in/on-road RFID devices/readers (each of which may contain a camera) at a given point will be referred to as a RoadCurtain 34-3. Note that, in some cases, a RoadCurtain may be constituted by a single in/on-road RFID device/reader (which may contain a camera). A RoadCurtain Station 34-6 is a fixed installation or a temporarily installation. A RoadCurtain Station contains at least a RoadCurtain 34-3, and means for enabling the RoadCurtain 34-3 to communicate with a remote controlling system 34-1 and with other RoadCurtain Stations and/or police vehicles 34-4 in the vicinity. A RoadCurtain Station 34-6 typically also contains a traffic camera 34-2 and optionally a weather station 34-8. The weather station 34-8 (if present) reports weather and air quality to the Controlling System 34-1 for traffic and emergency control purposes. The RoadCurtain Controller 34-7 (which is also typically part of a RoadCurtain Station 34-6) uses the weather data, information from other RoadCurtain Stations up and down the road, data from the Controlling System 34-1 and from its local RoadCurtain 34-3 and from its traffic camera 34-2, to detect vehicle identity and behaviour anomalies and/or the potential risk of an accident. Examples of such anomalies include: vehicle behaviour which indicates driving under the influence of intoxicating substances or fatigued; a top heavy truck; a vehicle which could not be identified or the identity verified; a vehicle identified to be on a list of interest as published by the Controlling System 34-1; etc. The RoadCurtain Station 34-6 reports its assessments up and down the road, using the Road Area network (RAN) 34-5, to following and preceding RoadCurtain Stations 34-6, to the Controlling System 34-1 and/or to police vehicles in communication with the RoadCurtain Stations (or any of them).

The assessment provided by a RoadCurtain Station 34-6 may therefore contain (at least) vehicle behaviour and identification anomalies. The assessment may be sent to the next RoadCurtain Station the vehicle may pass. This way, the vehicle with the anomaly may be tracked, even if it is not identified positively or at all. A non-identified vehicle may be detected by a lack of identification and/or fingerprint as determined by the traffic camera and/or the RoadCurtain cameras. The next RoadCurtain Station may attempt to correct the anomaly. If the anomaly reoccurs then the anomaly may be escalated in urgency. A police vehicle connected to any of the RoadCurtain Stations where the vehicle may pass may be alerted to the anomaly. This police vehicle may then request information about the anomaly, which may include images and video, allowing it to execute an intervention.

In summary, in the above system implementation, a RoadCurtain Station contains at least a set of RoadCurtain readers (although note again that a set may sometimes comprise just a single reader) and a roadside controller 34-7.

The RoadCurtain reader/device may be used in or on the road. For both on-road and in-road, the format/design and construction of the reader should preferably facilitate fast deployments. Maintenance may preferably involve simple replacement of one device for another on site (to avoid disruptions, etc, associated with attempting to repair/maintain a device while on-site). Of course, a device which is removed or "switched out" may be taken for off-site maintenance or repair before being returned to service.

Recall that a RoadCurtain may include multiple RFID readers. Each RoadCurtain reader uses an adapted dipole antenna with a "doughnut" shaped radiation pattern to detect and (if possible) positively identify vehicles with an RFID enabled number plate tag in a field of 1 m to 5 m up and down a 4 m wide lane to an effective high of 1.2 m.

Each RoadCurtain reader may (preferably) contain an RFID/RADAR capability and intelligence to enable it to:
  detect a vehicle with or without a working tag;
  read the tag;
  detect the speed and position of the vehicle;
  determine the length of the vehicle as well as the axle count;
  generate a radio fingerprint of the vehicle using (inter alia) a moving radar cross section of the vehicle;
  synchronise its radiation with adjacent RoadCurtain readers using both the detected side beams and the roadside controller thereby achieving frequency separation or phase locking with an aim to fill the gaps between adjacent beams where a vehicle may drive undetected; and
  shape the radiation pattern dynamically (adaptive radiation shaping) as the installation environment changes because of weather and other RF influencing factors.

Each RoadCurtain reader may contain a wireless data connectivity component to communicate with the roadside controller. Each RoadCurtain reader may also contain a set of fixed focus still cameras to image the front and back of the vehicle. The cameras may also be used to determine vehicle speed, length, width, lane position, following distance, body lean and axle counts. Images may be sent to the controller to "ANPR" the plate, fingerprint the vehicle and/or read identification symbologies, i.e. barcodes on the plate and/or the vehicle. Each RoadCurtain reader may also contain various other sensors, for example vibration, shock, temperature, etc, to aid in its functions. The RoadCurtain reader may also contain LED indicators to provide human-readable feedback on its functional status.

The roadside controller, which may also be mounted in a vehicle (e.g. a police car), receives data from the readers (possibly wirelessly) as well as images from the traffic camera and information from other sensors, for example weather sensors. This information is used for vehicle detection, identification, identity verification and behaviour observation, which may result in identification of a vehicle anomaly. This information may also be used to assess traffic conditions. The roadside controller may communicate with the set of readers (the RoadCurtain) for the purpose of supporting beam synchronisation. The roadside controller may also communicate with other controllers up and down the road and/or with a controlling system to gather data in support of confirming, relaying and escalation anomalies and traffic conditions. The roadside controller may pass information to a police vehicle connected to it, unsolicited or on-demand, instigating and/or supporting a roadside intervention.

The roadside controller intelligence may link the RFID data with the vehicles in the images and video streams; determine vehicle classification and type; perform Automatic Number Plate Recognition (ANPR) on the images received from the reader; detect traffic anomalies, identify the vehicles associated with the traffic anomalies; and process, alert and receive traffic and vehicle behaviour anomalies.

Figure 35:
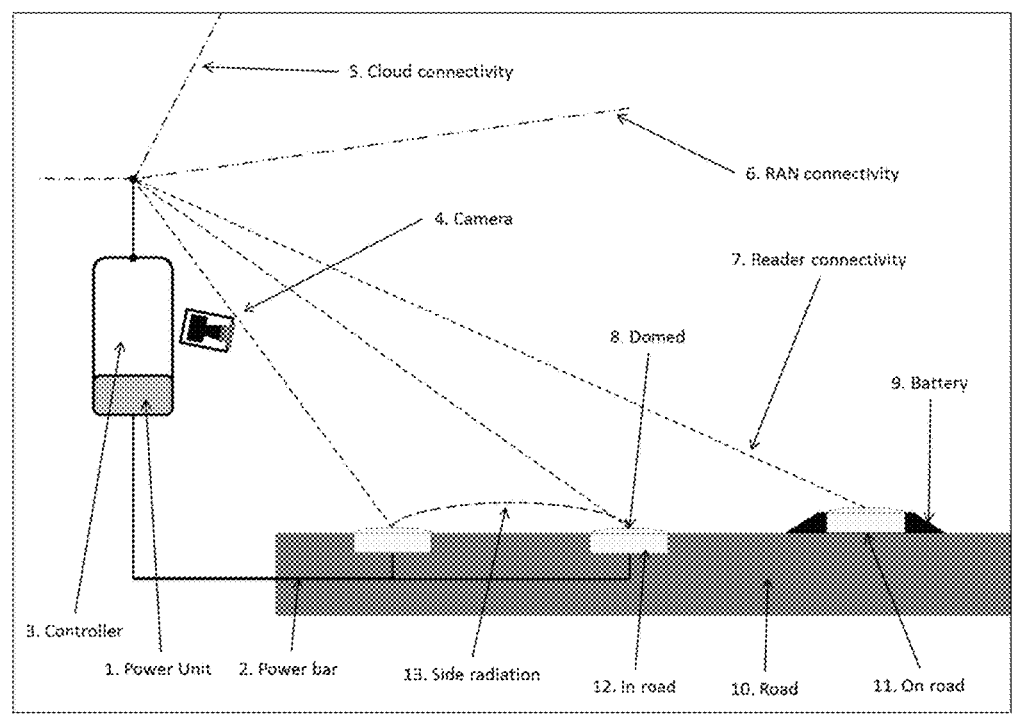
FIG. 35 and FIG. 36 are schematic illustrations of the placement of system components.
Figure 36:
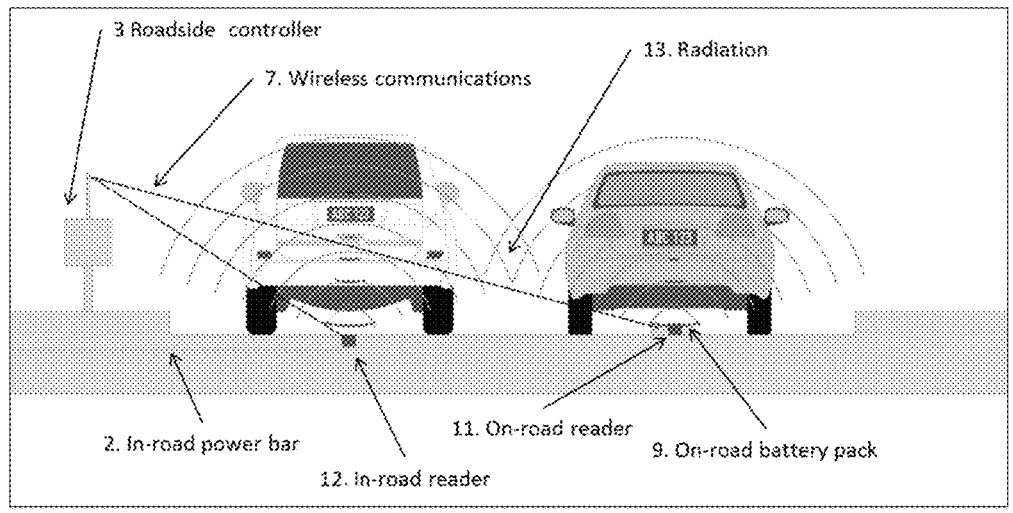

FIG. 35 and FIG. 36 illustrate preferred embodiment(s) and placement(s) of certain system components. An in-road reader 35/36-12 is mounted in a cavity in the road. An on-road reader 35/36-11, installed in a moveable speed bump, is temporarily deployed on the road 35-10. A reader is placed in a position where a vehicle will drive over it or pass close by. For wide roads (or wide driveways, etc) a set of two or more readers is placed in a line across the road/driveway ensuring that all vehicles will be detected passing on that driveway/road. The data recorded by the reader sensors (RFID with imaging, vibration, shock and/or RADAR) are communicated to the roadside controller 35/36-3 possibly using a wireless radio communication technology 35/36-7. The controller 35/36-3 gathers additional information from other sensors, for example a traffic camera 35-4, services in the cloud 35-5 and other controllers up or down the road. The controller uses this information to continuously detect vehicle identification and behaviour anomalies, as well as road and traffic conditions. The anomalies and traffic conditions are communicated along the connectivity path to other controllers. The connectivity path, of the interconnected controllers, follows the road to optimise the transfer of vehicles' information as they use the road. The interconnected controllers along the connectivity path form a Road Area Network or RAN 35-6. Power is supplied to in-road readers from a power 35-1 unit, which is typically in the controller 35-3, using an in-road "dirty DC" power bar 35/36-2. On-road readers, to facilitate fast deployment and eliminate cables, use a battery pack 35/36-9 which is also mounted in the moveable speed bump frame. Multi-reader synchronisation is performed using the side beam 35/36-13 and the controller. The readers are domed 35-8 to enable fluids, dust, etc, to flow, fall, etc, from the top of the readers.

Figure 37:
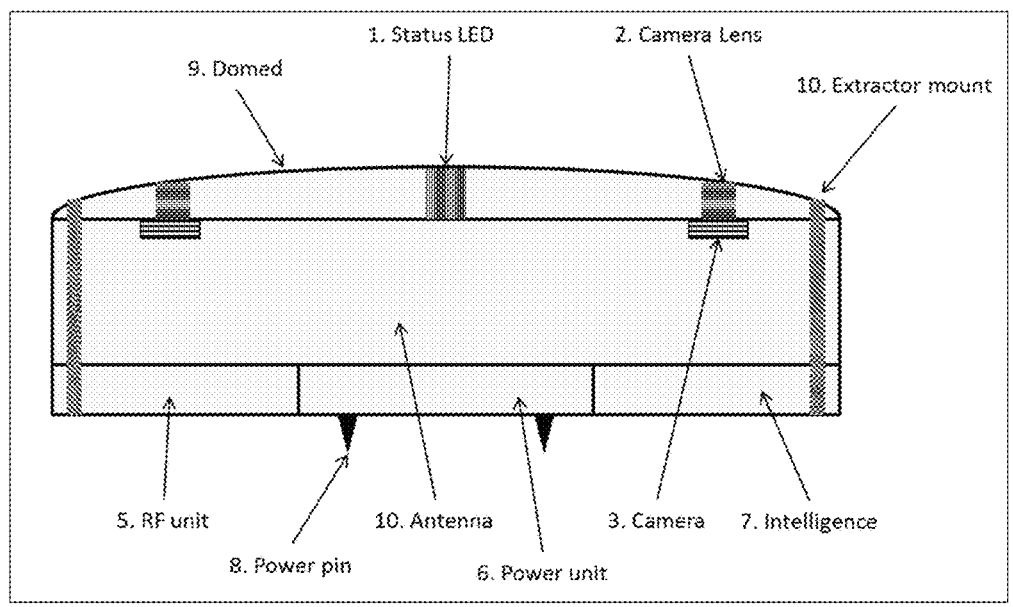
FIG. 37 schematically illustrates a possible embodiment of an in/on-road device.

FIG. 37 illustrates a preferred embodiment of an in/on-road device. The antenna 35-4 (which is an adapted dipole antenna) largely dictates the structure of the device. All other components are placed in a way not to obstruct or deform the antenna's desired "doughnut" shaped radiation pattern. The dimensions of the device are typically less than 300 mm in diameter for a circular unit (or 300 mm across for a square unit) and no more than 50 mm in height. The whole structure is filled with potting material to provide protection against shock, vibration, water, gas and other environmental factors. The top is domed 37-9 to a height that allows vehicle wheels to roll over, cleaning of the dome e.g. by fluid run-off, etc, but importantly the dome shape is low enough and shaped to minimise wheel shock and vibration. The dome may contain status LEDs 37-1 and lenses 37-2 with optical feeds to internal cameras 37-3. Other parts including:

the RF unit 37-5, which provides RFID, RADAR and wireless services;
the power unit 37-6, which cleans the "dirty DC" power; and
the intelligence unit 37-7, which may contain addition sensors, i.e. vibration, shock and temperature;

are located below the antenna ground plane. For in-road applications, the device construction allows for it to be pressed into a cavity in the road and also to be pulled from the cavity using the extractor mounts 37-10. The device is sealed in place using a non-hardening compound, for example bitumen. Power pins 37-8 connect the device to a power bus. The power bus, for a permanent installation in the road, is strip wire sealed into two cut lines across the road. The pins press into the strip wire. In on-road application, the pins connect with connection pads as provided in the movable speed bump frame. The movable speed bump frame contains rechargeable batteries. The batteries may be recharged using a common USB charging method.

Figure 38:
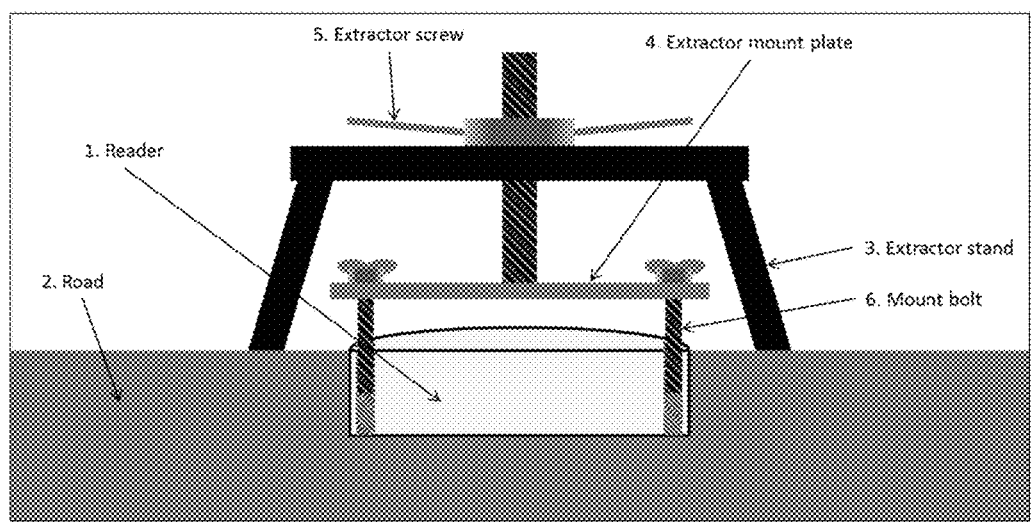
FIG. 38 illustrates a mechanism that can be used to easily remove the device of FIG. 37 from the road (in in-road scenarios).

FIG. 38 illustrates a mechanism to easily remove the reader 38-1 from the road.

The device is installed in the road 38-2 by cutting a cavity for the device and two slots for the power bus. The reader is pressed into the cavity and sealed with a non-hardening compound compatible with the road surface, for example bitumen, allowing the reader to be subsequently pulled from the cavity. The removal device consists of an extractor stand 38-3, which is placed over the reader to be removed. The extractor stand will typically have at least three legs. The extractor mount plate 38-4 is attached to the device with at least three mount bolts 38-6. The extractor screw 38-5 is then turned to lift the extractor mount plate upwards, pulling the reader from the cavity.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. An apparatus operable for use in detecting and identifying vehicles, where individual vehicles each have thereon at least one radio-frequency identification (RFID) communication device with a directional device antenna close to a surface on which the vehicles travel, a radiation pattern of each directional device antenna being directed parallel to a direction of vehicle travel, and each RFID communication device on the vehicle is operable, if correctly operational, to backscatter a modulated ultra-high frequency (UHF) signal to the apparatus indicating that particular vehicle's identity, the apparatus including an RFID reader, the RFID reader having a reader antenna operable to be positioned on or in the surface on which the vehicles travel, the reader antenna and the device antenna defining a read zone, and the RFID reader being operable, while the RFID communication device on the vehicle is in the read zone, to transmit a signal to the RFID communication device on the vehicle and, if the RFID communication device on the vehicle is correctly operational, to receive the modulated backscattered UHF signal from the RFID communication device on the vehicle indicating that particular vehicle's identity, so that that vehicle is identified using the apparatus, wherein a radiation pattern of the reader antenna has a shape that approximates a wide and low elliptic torus or a squashed doughnut located on or just above the surface on which the vehicles travel and centered on the position of reader antenna so a region of space is within the read zone, the region of space:

extending from approximately 5 meters (m) horizontally before the RFID reader antenna to approximately 5 m horizontally beyond the RFID reader antenna in the, or any, direction of vehicle travel, being approximately 4 m wide horizontally, perpendicular to the direction of vehicle travel, and extending from approximately 200 millimeters (mm) to approximately 1200 mm vertically above the surface on which the vehicles travel.

2. The apparatus as claimed in claim 1, wherein a region of space from approximately 1 m horizontally before the RFID reader antenna to approximately 1 m horizontally beyond the RFID reader antenna in the direction of vehicle travel, and for substantially all widths and heights within this horizontal space, relative to the RFID reader antenna location, is excluded from the read zone.

3. The apparatus as claimed in claim 1, wherein if the apparatus detects an unmodulated backscattered signal from the vehicle in the absence of a modulated signal from a RFID communication device on that vehicle, that vehicle is detected but not identified by the apparatus, to indicate that the RFID communication device on that vehicle may be absent or not operating correctly.

4. The apparatus as claimed in claim 1, wherein the apparatus RFID reader antenna is configured for use on or in the surface on which the vehicles travel.

5. The apparatus as claimed in claim 1, wherein the vehicles are road registered vehicles, the RFID communication device(s) and the device antenna(s) on a vehicle are mounted on or in one or more of a number or license plate of the vehicle, and the apparatus RFID reader, or at least parts of the apparatus RFID reader, including its antenna, is operable to reside on the road surface or to be installed in the surface of the road.

6. The apparatus according to claim 1 wherein the apparatus has radar capability operable to perform one or a combination of the following:

detect the speed and/or position of a vehicle, and obtain a moving radar cross section of the vehicle, and additionally, or alternatively, determine the length and/or axle count of a vehicle.

7. The apparatus according to claim 1 wherein the apparatus further includes one or more of cameras or imaging sensors, vibration or shock sensors, temperature sensors, weather sensors, air quality sensors or a combination.

8. A system for detecting, identifying and/or monitoring vehicles, where individual vehicles each have thereon at least one RFID communication device with a directional device antenna close to the surface on which the vehicles travel, the radiation pattern of each device antenna being directed parallel to the direction of vehicle travel, and each RFID communication device on a vehicle is operable, if correctly operational, to backscatter a modulated UHF signal indicating that vehicle's identity, the system including at least one apparatus according to claim 1, and a controller in communication with the at least one apparatus.

9. The system according to claim 8, wherein the vehicles are road registered vehicles, the RFID communication device on the vehicle is mounted on or in one or more of a number or license plate of the vehicle, the system including one or more stations at different road locations, each station having one or more of the apparatuses or a synchronized group of the apparatuses, and for each station there is a controller which is in communication with the apparatus(es), and the controller is a local roadside controller.

10. The system according to claim 9, wherein each station is in communication with a remote system controller.

11. The system according to claim 10, wherein the roadside controller of a station uses information from the roadside controller(s) of one or more other stations, information from the remote system controller, and/or data from its one or more apparatuses or synchronized group of apparatuses, to detect at least certain vehicle behavior.

12. The system according to claim 11, wherein the roadside controller of a station communicates its observations of vehicle behavior to the roadside controller(s) of one or more other stations and/or to a remote system controller.

13. The system according to claim 11, wherein the roadside controller of a station communicates its observations of an observed vehicle behavior, and/or of the vehicle's identity, to a law enforcement vehicle or personnel located on the vehicle's predicted route of travel.

14. The system according to claim 9, wherein one or more stations include a traffic camera operable to facilitate observation of vehicle behavior or to facilitate tracking of vehicles as image objects.

15. The system according to claim 9, wherein the roadside controller of a station is operable to communicate with the roadside controller of one or more other stations.

16. The system according to claim 8 wherein at least one apparatus or another element in the system includes one or more cameras or imaging sensors, vibration or shock sensors, temperature sensors, weather sensors, air quality sensors or a combination.

* * * * *